Oct. 8, 1935.   J. L. FERGUSON   2,016,814
CARTON FEEDING MECHANISM
Filed Sept. 4, 1930   10 Sheets-Sheet 1

INVENTOR.
John L. Ferguson
BY
Jones, Addington, Ames & Seibold
ATTORNEYS.

Oct. 8, 1935.  J. L. FERGUSON  2,016,814
CARTON FEEDING MECHANISM
Filed Sept. 4, 1930  10 Sheets-Sheet 2
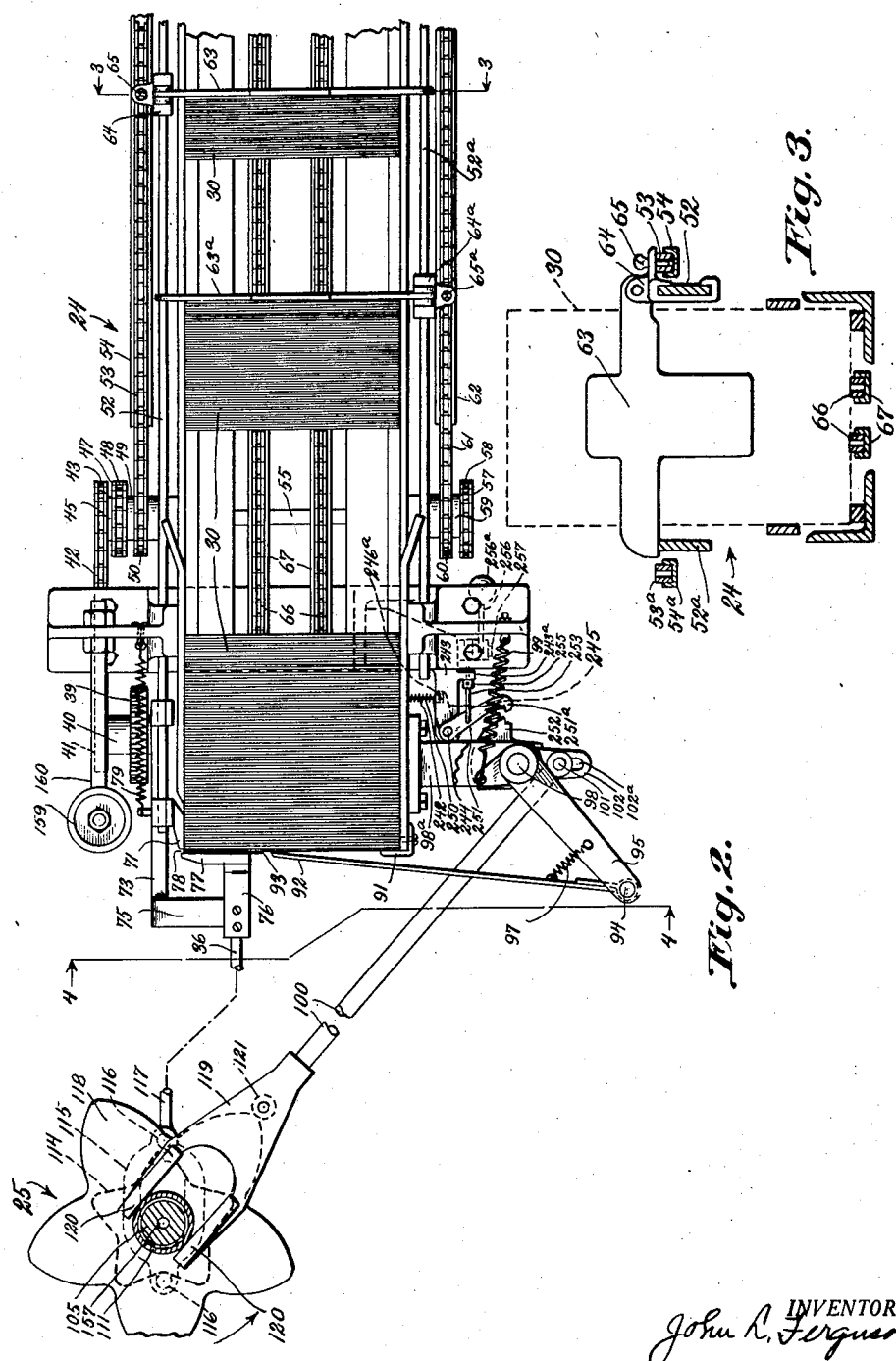
INVENTOR.
John L. Ferguson
BY
Jones, Addington, Ames & Seibold
ATTORNEYS.

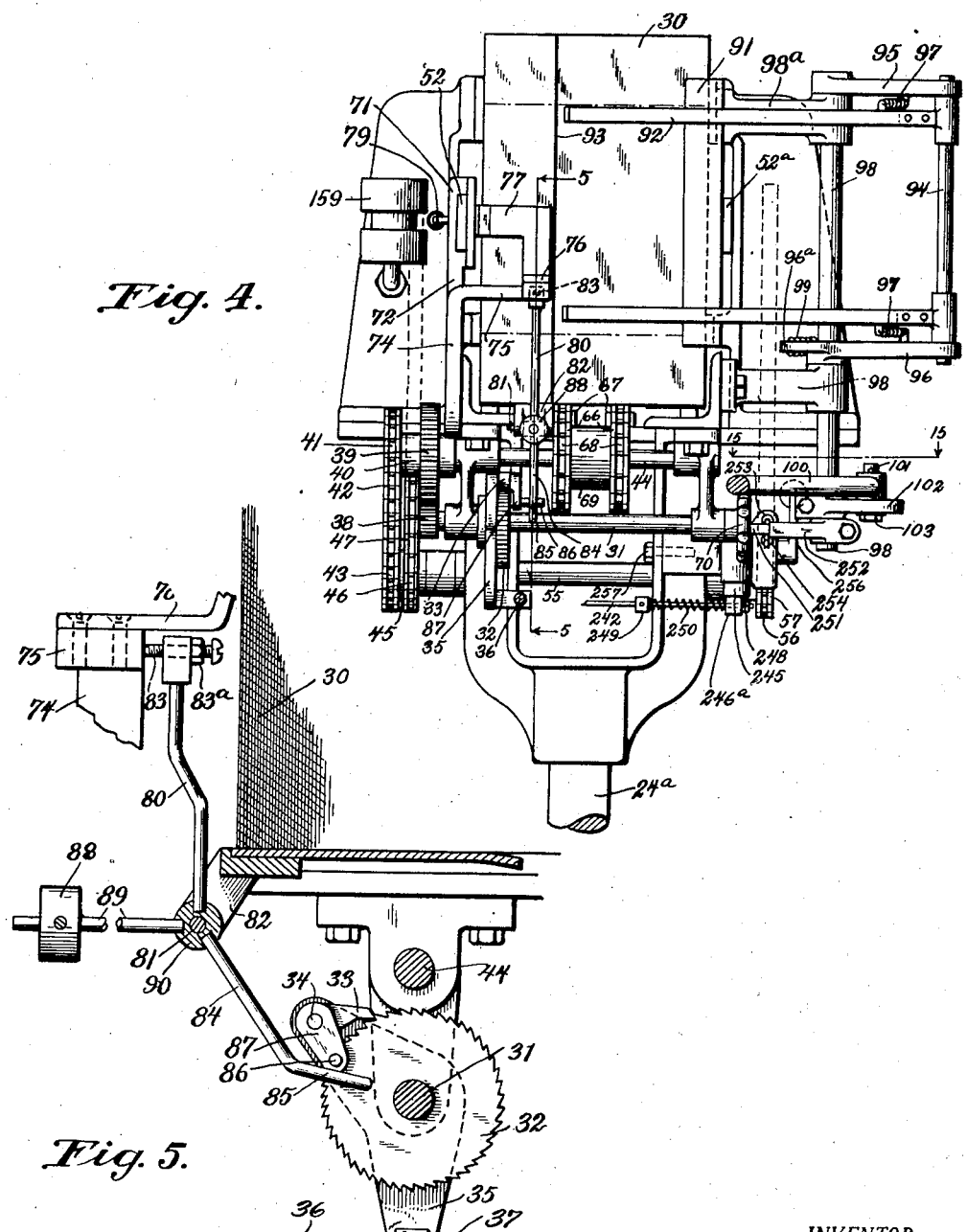

Oct. 8, 1935.  J. L. FERGUSON  2,016,814
CARTON FEEDING MECHANISM
Filed Sept. 4, 1930  10 Sheets-Sheet 4

INVENTOR.
John L. Ferguson
BY Jones, Addington, Ames & Seibold
ATTORNEYS.

Oct. 8, 1935.  J. L. FERGUSON  2,016,814
CARTON FEEDING MECHANISM
Filed Sept. 4, 1930  10 Sheets-Sheet 6

INVENTOR.
John L. Ferguson
BY Jones, Addington, Ames & Seibold
ATTORNEYS.

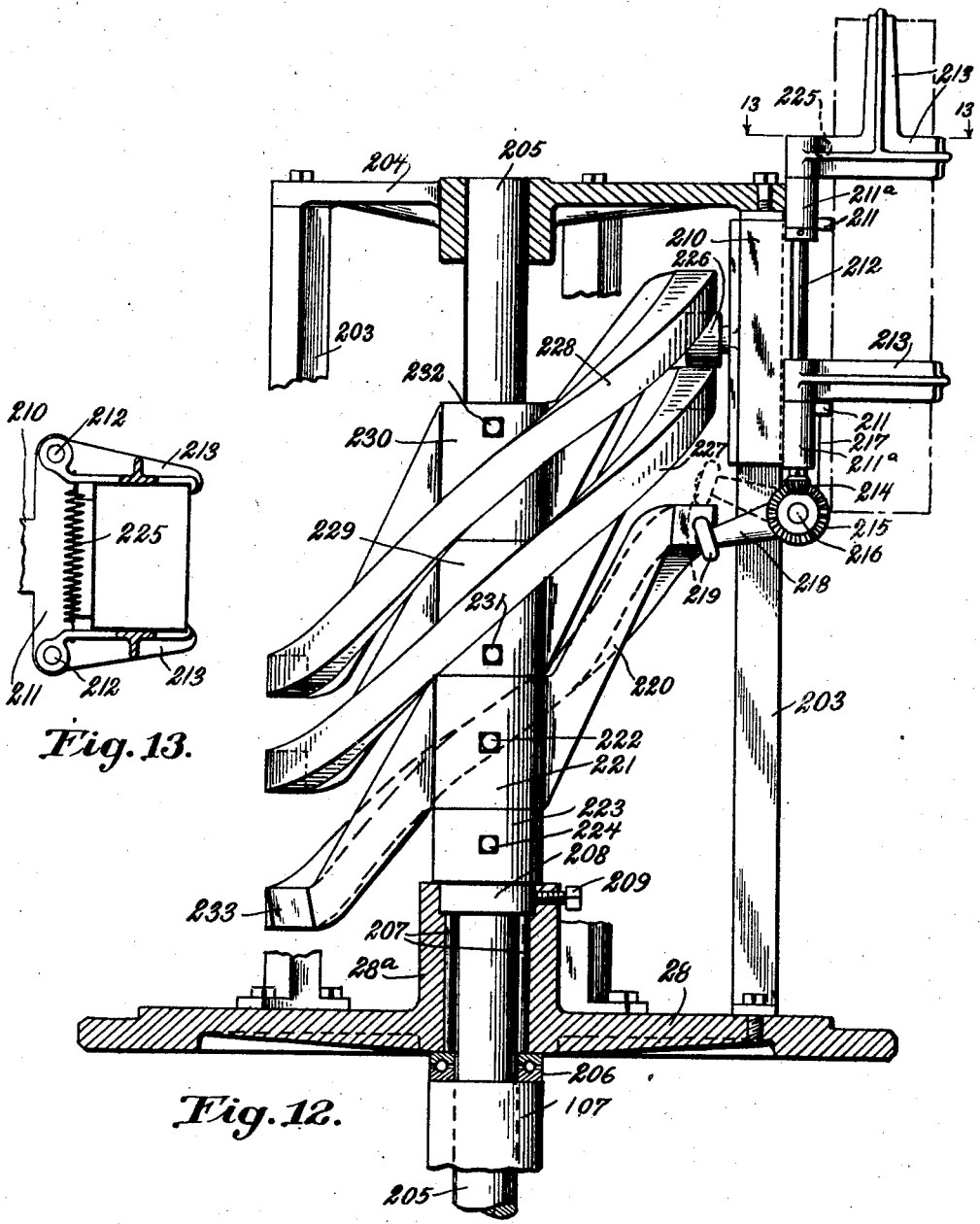

Oct. 8, 1935. J. L. FERGUSON 2,016,814
CARTON FEEDING MECHANISM
Filed Sept. 4, 1930 10 Sheets-Sheet 8

INVENTOR.
John L. Ferguson
BY
Jones, Addington, Ames & Seibold
ATTORNEYS.

Oct. 8, 1935.  J. L. FERGUSON  2,016,814
CARTON FEEDING MECHANISM
Filed Sept. 4, 1930  10 Sheets-Sheet 9

INVENTOR.
John L. Ferguson
BY Jones, Addington, Ames & Sibold
ATTORNEYS.

Oct. 8, 1935.  J. L. FERGUSON  2,016,814
CARTON FEEDING MECHANISM
Filed Sept. 4, 1930   10 Sheets—Sheet 10
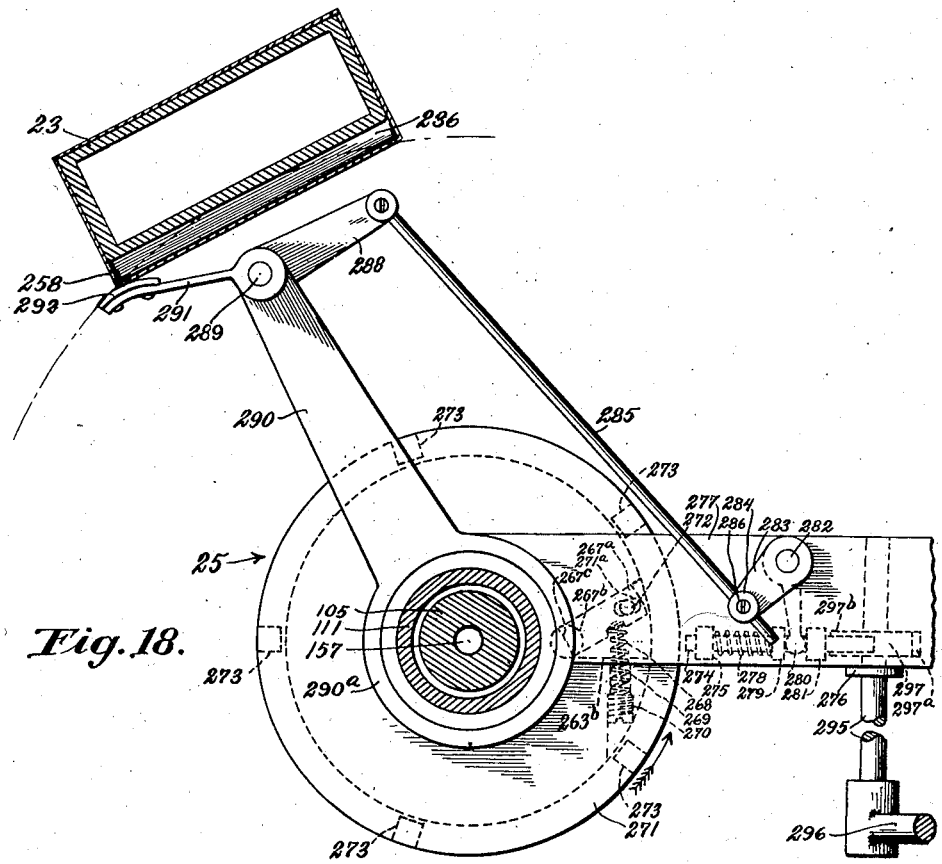
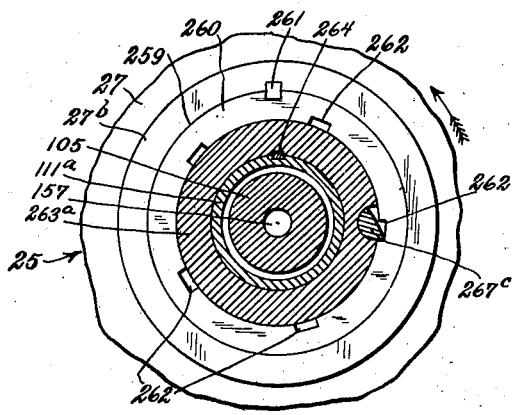

Patented Oct. 8, 1935

2,016,814

UNITED STATES PATENT OFFICE 2,016,814

CARTON FEEDING MECHANISM

John L. Ferguson, Joliet, Ill.

Application September 4, 1930, Serial No. 479,738

115 Claims. (Cl. 93—44)

This invention relates to carton feeding mechanism and has particular relation to automatic feeding mechanism for packaging machines.

A packaging machine to which the present invention is particularly adaptable, such, for example, as a machine of the type disclosed in United States Patent No. 1,423,094, issued July 18, 1922, to John L. Ferguson, embodies a plurality of blocks or stands upon which carton blanks are placed preparatory to sealing, filling and performing other operations thereon. These blocks are ordinarily carried by an endless chain, driven by suitable motive power provided for the packaging machine.

Heretofore it has been customary to have carton blanks placed upon the aforesaid blocks or the like by operators. These blanks are ordinarily supplied in collapsed form, the four side walls thereof being constituted by a suitable cardboard blank having its ends glued or pasted together. These side walls are bounded by creases and the blanks are normally folded along two of these creases that are diagonally opposite each other so that they lie in compact collapsed form. The end walls of the cartons are formed from ears projecting from the ends of the side walls, and slits are provided in the cardboard blanks at the edges of such ears whereby the same may be folded upon each other in the usual overlapping relation.

In some instances, all of these ears are of equal length, and in other instances they are of greater length on one side of the carton than on the other. The present invention is adapted for use with carton blanks of either of these types.

When carton blanks are manually placed upon the blocks of the packaging machine, the operator takes each blank individually and collapses it along the two diagonally opposite edges other than those two edges along which it was collapsed in its original state, this operation being termed the "recollapsing of the blank". Upon release of the blank from its recollapsed position, it springs back to a substantially rectangular cross-sectional shape adapted to be placed upon the block of the packaging machine, which blocks are of similar rectangular cross-section.

This operation of manually recollapsing each carton blank and placing it upon the moving blocks of the packaging machine requires an appreciable amount of time for each blank, and the speed of operation of the machine is thus materially limited. Labor costs and limitations of space do not ordinarily permit more than one operator to work on each machine, and, therefore, the speed of the packaging machine is limited to the speed at which a single operator can recollapse the carton blanks and place them upon the moving blocks of the machine.

It is an object of the present invention to accomplish the above described operations automatically, rather than manually; and thereby to overcome the limitation which has heretofore been encountered in speeding up the operation of packaging machines of the type specified.

Another object of the invention is to effect an economy in operation of machines of the type specified by dispensing with the necessity of having an operator for each of the machines and making it possible for one person to supervise the operation of a number of machines. The economy thus effected is due not only to the decrease in the cost of labor of operating machines, but also to the improvement in the operating efficiency of the machines due to the elimination of the element of human fatigue.

The invention comprises, in general, mechanism mounted at the side of a packaging machine and including means for accomplishing all of the operations which have heretofore been accomplished manually in this connection. The carton blanks in the heretofore described collapsed form are placed in a magazine extending along the packaging machine, and are individually removed from the delivering end of the magazine by a device which opens and recollapses each blank to place the same in substantially rectangular form. A transfer device takes the opened carton blanks individually from the opening device and places them upon the moving blocks of the packaging machine, whereafter this machine functions to perform any desired operations upon the blanks.

The invention will be better understood, and other objects and advantages thereof will appear, from a consideration of the following detailed description in connection with the accompanying drawings, in which:

Fig. 2 is a fragmentary top plan view of the delivering end of the magazine for the carton blanks and of the mechanism for removing the blanks therefrom individually, certain parts being shown in horizontal section where they are cut by the line 2—2 in Fig. 9, hereinafter described.

Fig. 3 is a fragmentary vertical sectional view taken on the line 3—3 of Fig. 2 and showing parts of the mechanism for feeding the blanks in the magazine up to the delivering end thereof;

Fig. 4 is an elevational view of the delivering end of the magazine and mechanism associated therewith, showing in vertical section the parts cut by the line 4—4 in Fig. 2;

Fig. 5 is a fragmentary vertical sectional view taken along the line 5—5 of Fig. 4;

Fig. 12 is a view, partly in side elevation and partly in central vertical section, of a transfer device for taking the open carton blanks from the opening device and placing the same upon the moving blocks of the packaging machine;

Fig. 13 is a fragmentary view, partly in top plan and partly in horizontal section, taken on the line 13—13 of Fig. 12;

Figure 9:
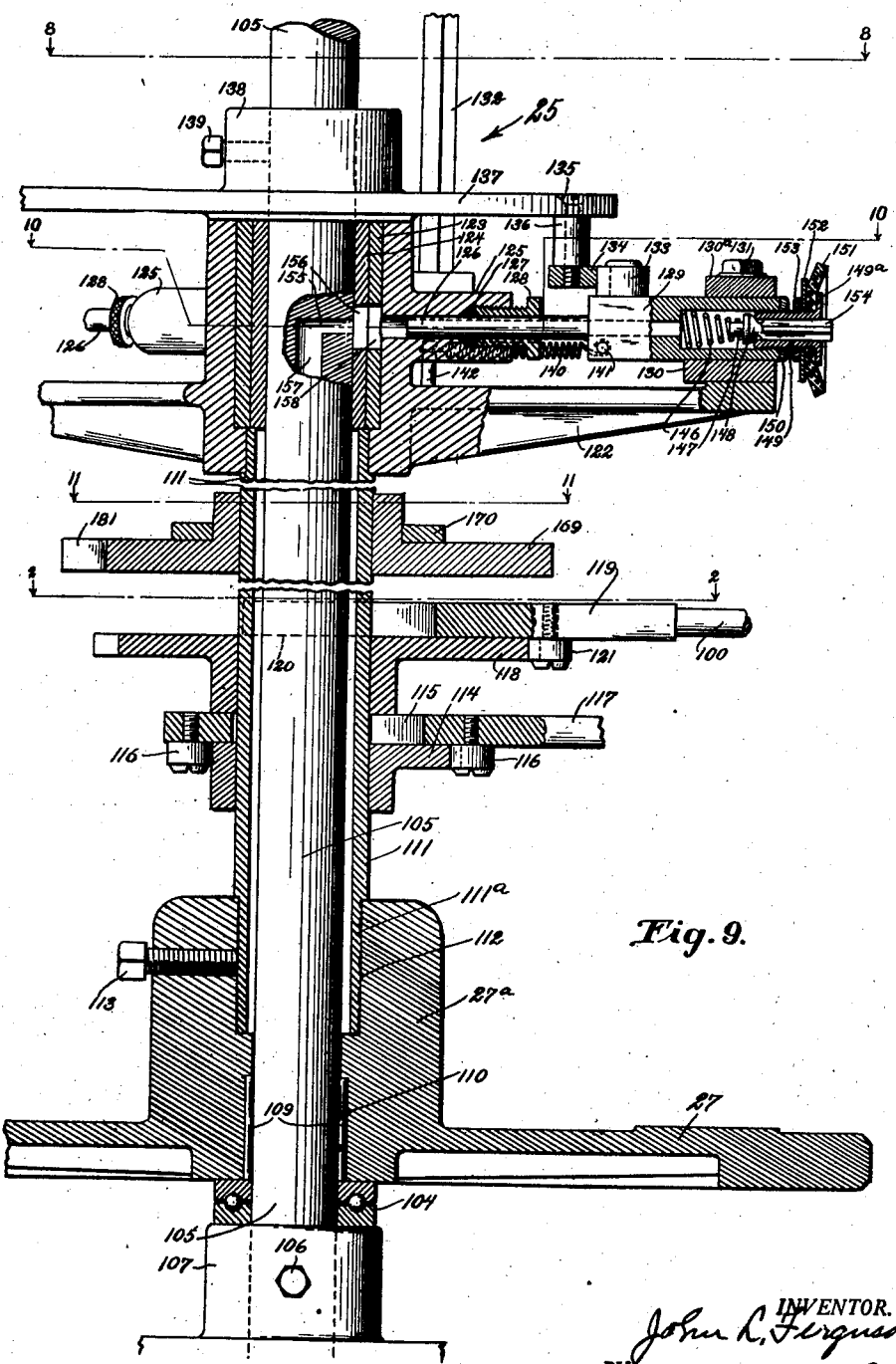
Fig. 9 is a vertical sectional view taken on a central plane of the carton opening device.
Figures 14, 15, 16:
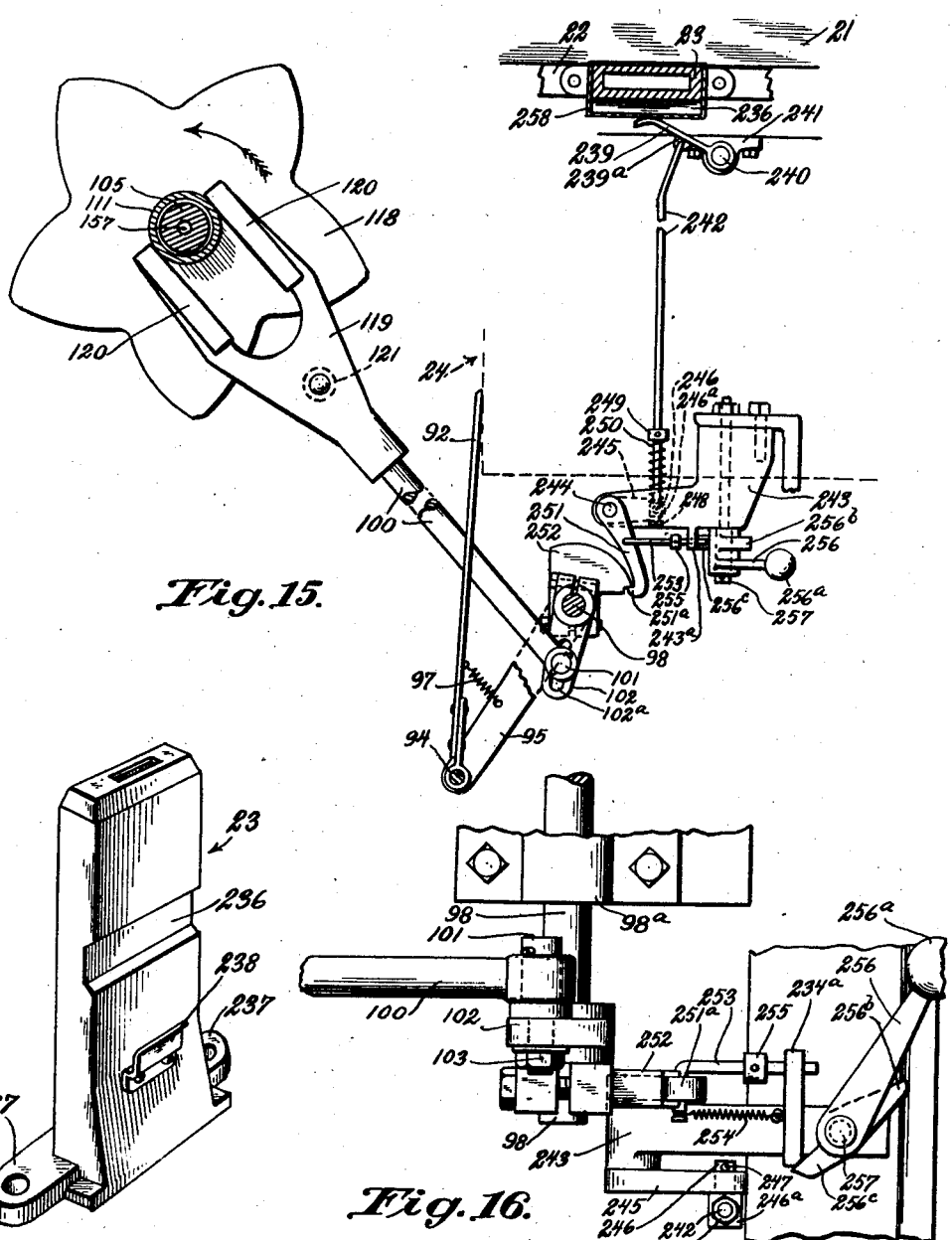
Fig. 14 is a detail perspective view of one of the blank-receiving blocks carried by the moving chain of the packaging machine.
Figure 17:
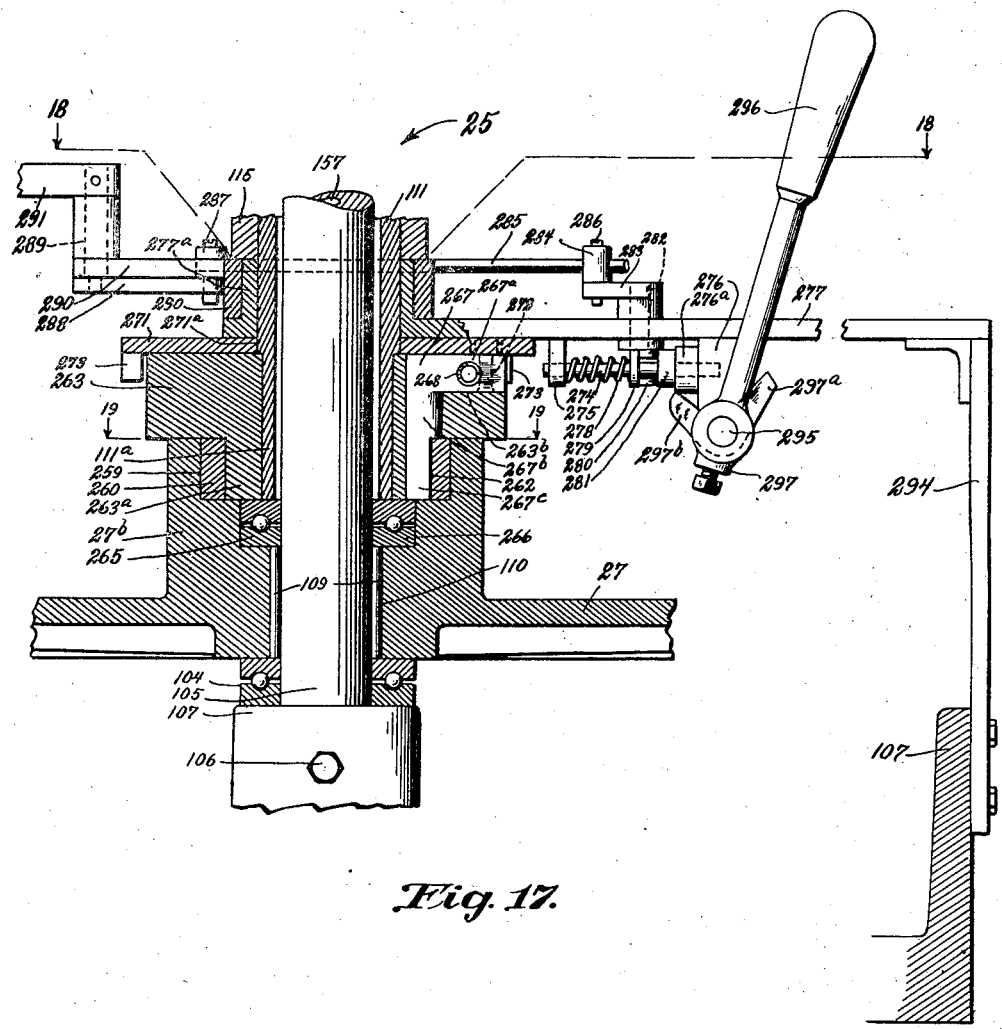

Fig. 15 is a fragmentary view, partly in top plan and partly in horizontal section, taken along the lines 2—2 of Fig. 9 and 15—15 of Fig. 4 and illustrating the operation of certain protective mechanism operative when a blank-receiving block of the packaging machine still carries a blank which was previously supplied thereto and which was not duly removed during the operation of the packaging machine;

Fig. 16 is a fragmentary side elevational view of part of the mechanism shown in Fig. 15;

Fig. 17 is a fragmentary vertical sectional view taken in the same plane as Fig. 9 and illustrating parts of a modified form of protective mechanism which may be utilized instead of that shown in Figs. 15 and 16, and also showing how certain parts of the mechanism shown in the lower portion of Fig. 9 may be modified to accommodate such modified protective mechanism;

Fig. 18 is a fragmentary view, partly in top plan and partly in horizontal section, taken along the line 18—18 of Fig. 17, and further illustrating this modified form of protective mechanism; and Fig. 19 is a fragmentary view, partly in top plan and partly in horizontal section, taken along the line 19—19 of Fig. 17.

Figure 1:
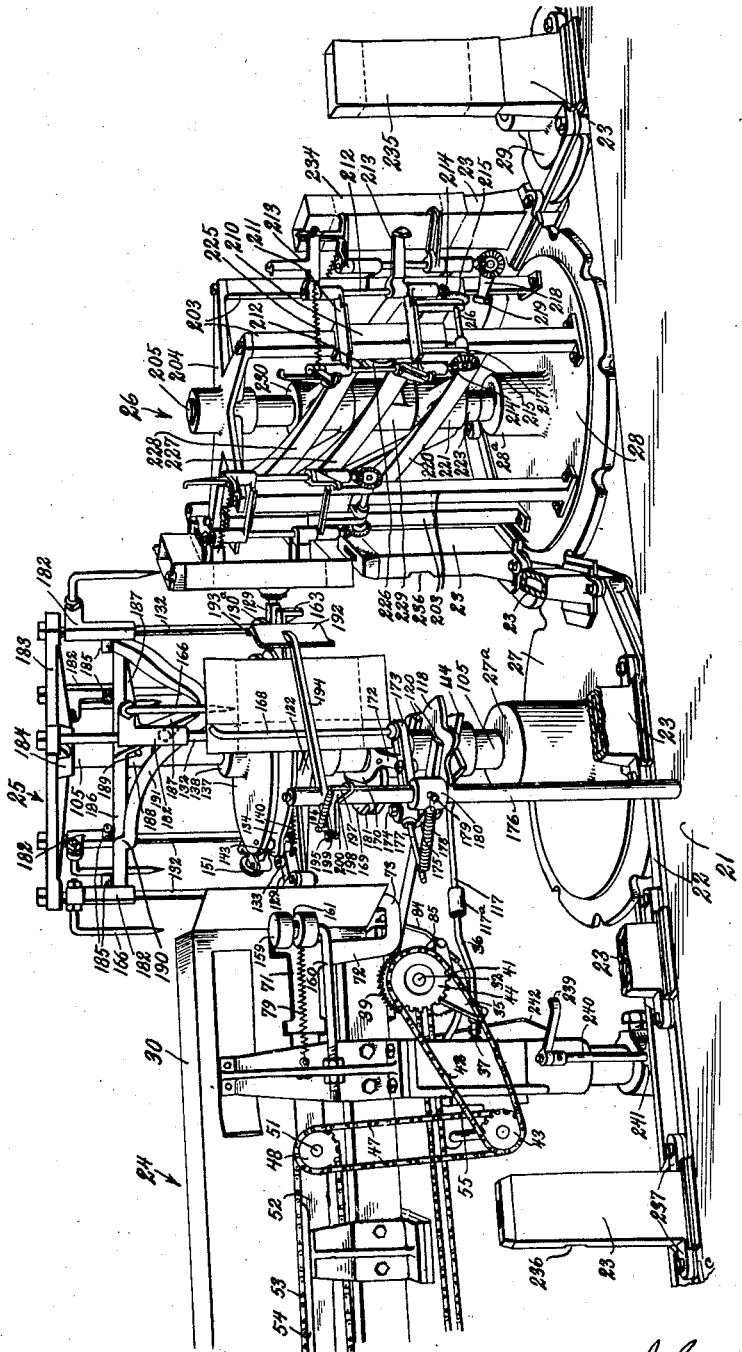
Figure 1 is a general perspective view of a feeding device constructed according to the present invention and applied to a packaging machine, only those details of the packaging machine which are essential to an understanding of the invention being shown.

Referring first to the general perspective view of the invention shown in Fig. 1, a bed plate 21 of a packaging machine, to which the invention is applied, is provided with an endless chain 22, which carries a plurality of blocks 23 adapted to carry the opened carton blanks to the mechanism of the packaging machine which performs the desired operations upon the blanks. These blanks are supplied in collapsed form through a magazine, indicated generally by the reference character 24, and are taken from the delivering end of the magazine by an opening device, indicated generally by the reference character 25. After the blanks have been opened by the operation of the opening device 25, they are removed therefrom by a transfer device, indicated generally by the reference character 26, which transfer device places the opened blanks upon the moving blocks 23.

The opening device 25 comprises a rotating assembly actuated by the action of the chain 22 upon a sprocket-wheel 27 at the base of said opening device. The transfer device 26 likewise comprises a rotating assembly driven by the action of the chain 22 upon a sprocket-wheel 28 at the base of the transfer device. It will be seen that the chain 22, which moves from left to right as viewed in Fig. 1 of the drawings, passes along the edge of the bed plate of the packaging machine, and engages the foremost and right-hand portions of the sprocket-wheel 27, whence it passes around the back of the sprocket-wheel 28 and is brought back to its normal path of travel along the edge of the bed plate 21 by an idler sprocket 29. It will be understood that the chain 22 is driven by any suitable motive power provided for the operation of the packaging machine, and that such chain may be supported and guided by any suitable track extending along the edges of the bed plate 21.

It will also be understood that the application of the carton opening device to a packaging machine originally constructed for manual feeding involves only minor changes in such construction. The feeding mechanism is mounted at the side of the bed plate of the packaging machine and the chain 22 is simply lengthened sufficiently by providing it with additional links and blocks 23, to permit its extension around the sprocket-wheel 28 of the transfer device, instead of having the chain continue directly along the edge of the bed plate 21 for the full length of the same.

A plurality of collapsed carton blanks 30 are placed in the magazine 24 by an attendant and are removed individually from the delivering end of the magazine by the action of the opening device 25. The delivering end of the magazine is the right-hand end thereof as viewed in Fig. 1 and the left-hand end as viewed in Figs. 2 and 5 of the drawings. In order to feed the carton blanks 30 up to the delivering end of the magazine 24 under substantially constant pressure, feeding means are provided, which comprise a plurality of sprocket-wheels and chains cooperating therewith. These sprocket-wheels and chains are actuated from a transverse shaft 31, shown in Figs. 4 and 5 of the drawings. This shaft is intermittently rotated by a ratchet wheel 32 secured thereto and a pawl 33 cooperating with the toothed periphery of the wheel 32.

The pawl 33 is mounted upon a pivot 34 carried by an oscillating member 35, that is pivotally mounted on the shaft 31. The oscillation of the member 35 is effected by a reciprocating rod 36 that is connected to a downwardly extending portion of said member 35 through a coiled compression spring 37. The rod 36 is reciprocated by a cam mounted on the rotating assembly of the opening device 25, and the details of construction of this cam mechanism will be more fully described hereinafter.

The shaft 31 is provided, at its left-hand extremity as viewed in Fig. 4, with a pinion 38 which meshes with a gear wheel 39. The gear wheel 39 has a hub portion 40 which also carries a sprocket-wheel 41 provided with a cooperating chain 42 extending downwardly and to the left, as viewed in Fig. 1, to a sprocket-wheel 43. The hub portion 40 of the gear wheel 39 and sprocket-wheel 41 is secured to a transverse shaft 44 that is suitably journaled in the frame of the magazine. The sprocket-wheel 43 has a hub portion 45, shown in Fig. 4, which also carries a sprocket-wheel 46, from which a cooperating chain 47 extends upwardly to a sprocket-wheel 48. The sprocket-wheel 48, as best shown in Fig. 2, has a hub portion 49 upon which a sprocket-wheel 50 is also mounted. The sprocket-wheels 48 and 50 are loosely journaled by means of the hub portion 49 on a stud 51 (Fig. 1) carried by a side rail 52 of the magazine frame. A chain 53 operatively engages the sprocket-wheel 50 and extends rearwardly therefrom along the side rail 52 of the magazine frame, the upper side of this chain resting upon a horizontal guide or track member 54.

The hub portion 45 of the sprocket-wheels 43 and 46 is secured, as shown in Fig. 4, to the left-hand end of a transverse shaft 55 that is suitably journaled in the frame of the magazine. The opposite end of the shaft 55 has a sprocket-wheel 56 secured thereon and a chain 57 operatively engages the sprocket-wheel 56 and extends upwardly therefrom to engage a sprocket-wheel 58 having a hub portion 59 (Fig. 2) journaled upon a stud corresponding to the stud 51 upon which the sprocket-wheels 48 and 50 are journaled, but disposed at the opposite side of the magazine. The hub portion 59 also carries a sprocket-wheel 60 which drives a chain 61 corresponding to the chain 53 and extending along the opposite side of the magazine. The upper part of the chain 61 is supported upon a guide or track 62, in the same manner that the upper part of the chain 53 is supported upon the guide or track 54.

The upper parts of the side chains 53 and 61 are adapted to be driven toward the delivering end of the magazine 24 by means of the mechanism above described, and are provided with means for transmitting this driving force to the back of the body of carton blanks in the magazine. The means for transmitting this driving force to the carton blanks comprises one or more plates 63 adapted to extend across the magazine behind the body of carton blanks and to be secured to either or both of the side chains 53 and 61, as shown in Figs. 2 and 3.

Preferably two of the plates 63 are provided, one of these plates being hinged on an axis extending longitudinally of the magazine to a slide 64 that is slidable along the side rail 52 of the magazine adjacent the chain 53. This slide is provided with a removable pin 65 for connecting the same in operative relation to the chain 53 whereby the plate 63 and slide 64 are moved along the magazine in unison with the movement of the chain 53. The other one of the plates specifically designated as 63a, is preferably mounted upon a slide 64a slidable along a side rail 52a corresponding to the rail 52 but located at the opposite side of the magazine, adjacent the driving chain 61. The slide 64a is similarly provided with a removable pin 65a, whereby this slide and plate are moved in unison with the movement of the driving chain 61 along the magazine.

The object in providing the two plates 63 and 63a, respectively, associated with the driving chains 53 and 61, is that when the supply of blanks that is being advanced in the magazine by one of these plates is nearly exhausted, an additional supply may be placed in the magazine behind this plate and pushed up firmly against the same by the attendant. The plate that is driven by the chain at the other side of the magazine is then brought up against the back of this additional supply of blanks and its slide 64 and 64a is pinned to the corresponding driving chain 53 or 61. The plate at the back of the supply of cartons that is nearly advanced may then be removed by rotating it upwardly about its hinged mounting on the slide 64 and 64a, which slide may then be slid rearwardly of the magazine without interference with the other slide and plate which are actuated by the driving chain at the opposite side of the magazine. In this manner the supply of carton blanks in the magazine may be readily replenished while the mechanism is in operation without releasing the feeding pressure on the blanks already in the magazine. It will be noted upon referring to Fig. 3 that each of the plates 63 and 63a extends entirely across the magazine and is slidably supported on the side rail thereof opposite that carrying the slide to which the corresponding plate is hinged. The middle portions of these plates are preferably considerably enlarged to afford a substantial area of contact between the same and the carton blanks to be fed up in the magazine.

The advancement of the carton blanks in the magazine is also facilitated by the provision of driving chains 66 that are guided upon tracks 67 extending longitudinally of the magazine at the bottom thereof. The lower edges of the carton blanks in the magazine rest upon the chains 66, which are advanced at the same rate as the chains 53 and 61. This movement of the chains 66 is accomplished by means of driving sprockets 68 therefor, which, as shown in Fig. 4, are provided with a common hub portion 69 that is secured to the transverse shaft 44, heretofore described. It will be understood that all of the driving chains 53, 61 and 66 are supported by idler sprockets (not shown) at the rear end of the magazine 24.

In order that the carton blanks may be fed up in the magazine, if desired, at a greater rate than that effected by the automatic operation of the mechanism described, the right-hand end of the transverse shaft 31, as shown in Fig. 4, is provided with a hand wheel 70 which may be manually rotated to increase the feeding pressure applied to the carton blanks in the magazine. Such manual adjustment will not be impeded by the driving means for the shaft 31, since such driving means are constituted by the ratchet wheel 32 and the pawl 33, as previously described.

In order that the carton feeding device may operate satisfactorily, it is desired that the carton blanks be fed up to the delivering end of the magazine under a substantially constant pressure. This pressure is regulated by providing a yoke 71 that is slidably mounted on the side rail 52 of the magazine adjacent the delivering end thereof. This yoke, as seen in Figs. 1, 2, 4 and 5 of the drawings, comprises an arm 72 extending downwardly from the side rail 52 and then bent to form a forwardly extending portion 73 disposed at a level below that of the lower edges of the carton blanks in the magazine. The forward extremity of this portion 73 is then turned to form an upwardly extending portion 74. The upper extremity of the portion 74 is bent inwardly to form a substantially horizontal portion 75 which extends in front of the delivering end of the magazine and has an arm 76 secured thereto and extending toward the delivering end of the magazine. The end of the arm 76 that is adjacent said end of the magazine is provided with a pressure finger 77 so disposed as to be engaged by the foremost carton blank in the magazine. The finger 77 is separated from the forward extremity of the slidably mounted portion of the yoke 71 by a space, indicated in Fig. 2 by the reference character 78. This space may be varied by adjusting the position of the arm 76 with respect to the portion 75 of the yoke, and is made very slightly greater than the thickness of a single collapsed carton blank. In this manner, it is assured that only one blank may be fed out of the delivering end of the magazine at a time, thus eliminating any wastage of blanks or damage to the mechanism by reason of more than one blank being moved out of the magazine at a time.

The slidable yoke 71 is biased toward the back of the magazine by a tension spring 79, the forward extremity of which is secured to the yoke 71 and the rear extremity of which is suitably secured to the frame of the magazine. If the carton blanks are not fed up to the delivering end of the magazine under sufficient pressure to permit satisfactory operation of the mechanism, the yoke 71 will be moved rearwardly of the magazine a slight distance under the influence of the tension spring 79. When this condition occurs, an upwardly extending lever arm 80 (Fig. 5), which is pivoted upon a fixed shaft 81 carried by a bracket 82 secured to the forward end of the magazine frame, is also moved rearwardly. This movement is effected by engagement between the portion 75 and the yoke 71 and an adjusting screw 83 disposed at the upper extremity of the lever arm 80. A downwardly and rearwardly extending lever arm 84, that is fixed with respect to the lever arm 80 on the pivot 81, is provided with a tail portion 85 extending under a pin 86 that is mounted at the lower extremity of a crank arm 87 to which the pawl 33 is secured.

By means of this arrangement, a downward and forward movement of the tail portion 85 caused by the rearward movement of the lever arm 80 permits the pawl 33 to overtake a greater number of teeth of the ratchet wheel 32 for a given reciprocatory movement of the rod 36, which actuates the oscillating member 35 upon which the pawl 33 is pivotally mounted. Thus, if the pawl 33 normally overtakes two teeth of the ratchet wheel 32 for each movement of the rod 36 to the right, as viewed in Fig. 5, a movement of the tail portion 85 in response to a rearward movement of the lever arm 80 may permit the pawl 33 to overtake three teeth on the ratchet wheel 32 at the next movement of the rod 36 to the right. In like manner, when the yoke 71 is moved too far forward by reason of the application of excessive feeding pressure to the carton blanks in the magazine, the lever arm 80 moves forwardly and effects a corresponding upward and rearward movement of the tail portion 85 of the lever arm 84. This movement raises the pawl 33 on its pivot 34 and may permit the pawl to overtake only one tooth of the ratchet wheel 32 at the next movement of the actuating rod 36, or it may prevent said pawl from overtaking even a single tooth.

The adjusting screw 83 at the upper extremity of the lever arm 80 is maintained in engagement with the portion 75 of the yoke 71 by means of a counterweight 88 that is mounted on a forwardly extending lever arm 89. This lever arm 89 is fixed with respect to the lever arms 80 and 84, these three lever arms being provided with a common hub portion 90 pivotally mounted upon the supporting shaft 81. It will be further understood that the desired operation of the feed regulating means may be obtained by adjustment of the screw 83, this screw being provided with a lock nut 83a for securing it in its desired position.

In order that the carton blanks in the magazine may not be forced too far out at the delivering end thereof, on the side opposite that at which the yoke 71 is mounted, one leg of an angle member 91 is secured to the frame of the magazine and the other leg thereof extends a short distance in front of the delivering end of the magazine, as shown in Figs. 2 and 4.

The feeding of the carton blanks out of the delivering end of the magazine is accomplished by a pair of feeding fingers 92, which are also shown in Figs. 2 and 4. The extremities of these fingers are adapted to engage a crease or seam 93 of the foremost carton blank in the magazine, and are mounted to be reciprocated across the face of the magazine to actuate the foremost carton blank by reason of such engagement. The opposite extremities of the feeding fingers 92 are secured to a vertical shaft 94 that is pivotally supported by the outer extremities of two lever arms 95 and 96, respectively, disposed at the upper and lower extremities of the shaft 94. Tension springs 97 are connected at their respective extremities with intermediate portions of the feeding fingers 92 and the supporting lever arms 95 and 96 to bias the feeding ends of the fingers 92 against the foremost carton blank in the magazine with the desired pressure.

The lever arms 95 and 96 are secured to a vertical shaft 98 that is suitably journalled in brackets 98a secured to the frame of the magazine 24, and that is adapted to be oscillated by means of a tension spring 99 and a reciprocating rod 100. The spring 99 is connected between the frame of the magazine and a lever arm 96a that is preferably integral with the arm 96, although it may be separately secured to the shaft 98, if desired. The direction of extension of the arm 96a from the shaft 98 is such that said shaft is urged by the spring 99 to turn in a clockwise direction as viewed from the top (Fig. 2), which arrangement, therefore, results in the feeding fingers 92 being urged to the left as viewed in Fig. 4.

The right-hand end of the rod 100 is pivotally connected to a pin 101 that is adjustably secured to a lever arm 102 by means of a slot 102a in said lever arm and a suitable nut or cap-screw 103 which may be loosened to permit shifting of the pin 101 along the slot 102a and tightened to secure said pin in any desired position. The arm 102 is secured to the lower extremity of the shaft 98 and thus transforms the reciprocating movement of the rod 100 into oscillating movement of the shaft 98.

The rod 100 is reciprocated by mechanism associated with the opening device 25, as described hereinafter. It may be stated at this point, however, that the rod 100 is moved to the right, as viewed in Figs. 2 and 4, by a cam, and that it is normally moved in the opposite direction by the action of the spring 99, which return movement is accompanied by a movement of the feed ng fingers 92 to the left as viewed in Fig. 4 and upwardly as viewed in Fig. 2. This movement of the fingers 92 causes the ends thereof to engage the crease or seam 93 of the foremost carton blank in the magazine and thereby to feed such blank out of the magazine through the open space 78 in the yoke 71. The return of the rod 100 to its extreme right-hand position is positively effected by its operating cam and retracts the fingers 92 so that they may duly feed out the next carton blank. The reason for utilizing the spring 99 rather than positive actuating means for effecting the feeding movement of the fingers 92 will appear hereinafter.

Figure 8:
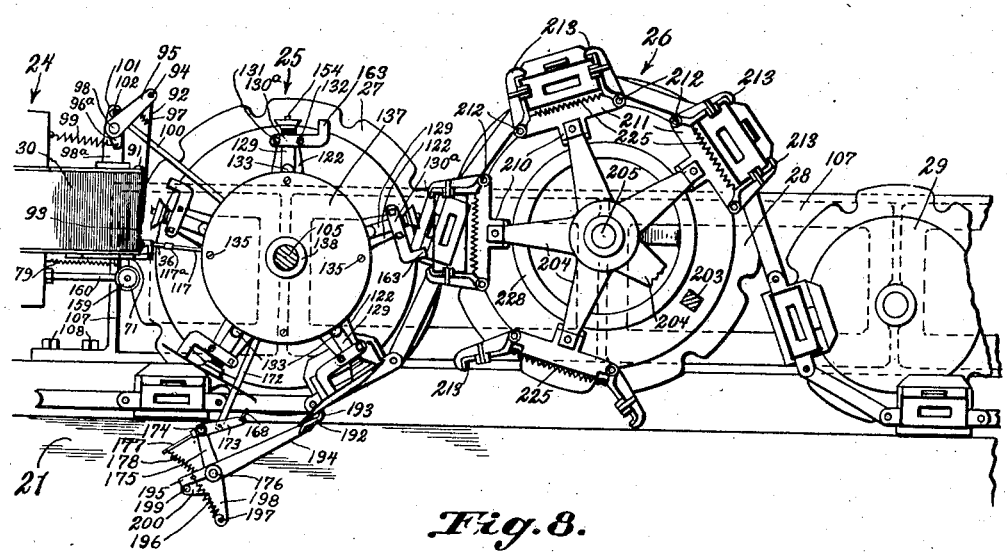
Fig. 8 is a general view, principally in top plan but partly in horizontal section along the line 8—8 of Fig. 9, hereinafter described, of the essential elements of the entire carton feeding mechanism, including the magazine, opening device, transfer device, and the moving chain of the packaging machine carrying the blocks upon which the carton blanks are to be placed.

The construction of the opening mechanism 25 will be best understood by referring first to Fig. 9 of the drawings, in which it will be seen that the sprocket-wheel 27 is supported from beneath by a thrust bearing 104 surrounding a fixed vertical shaft 105 that is secured by a set screw 106 to a frame 107 which supports the opening device 25, transfer device 26 and the idler sprocket-wheel 29. Fig. 8 shows the manner in which this frame 107 is secured by bolts 108 to the side of the frame or bed plate 21 of the packaging machine.

A plurality of bearing rollers 109 are disposed between the fixed shaft 105 and a bore 110 in the lower part of a hub portion 27a of the sprocket-wheel 27 to reduce the rotating friction of this sprocket-wheel. A rotatable sleeve 111 concentrically surrounds the fixed shaft 105 in slightly spaced relation thereto, and comprises a reduced diameter portion 111a at its lower extremity which is fitted within an enlarged bore 112 in the upper part of the hub portion 27a of the sprocket-wheel 27. The sleeve 111 is firmly secured to the sprocket-wheel 27 by a set screw 113 threadedly engaging a suitable opening in the hub portion 27a, or by other suitable means.

Secured to the rotatable sleeve 111 above the hub 27a is a cam 114, this cam also being shown in Fig. 1 and being shown in dotted lines in Fig. 2. A yoke 115 is provided with an elongated opening surrounding the sleeve 111 immediately above the cam 114, and this yoke is supported from below by said cam 114. Two rollers 116 are pivotally mounted on the lower surface of the yoke 115 and engage diametrically opposite points on the periphery of the cam 114. The right-hand portion of the yoke 115, as viewed in Fig. 9, is formed into a rod 117 which is connected by means of a sleeve-joint 117a shown in Fig. 1, to the rod 36 for actuating the hereinbefore-described ratchet and pawl mechanism for feeding the collapsed carton blanks up to the delivering end of the magazine 24.

Thus, it will be seen that the normal rotation of the cam 114 by the sleeve 111, to which it is secured, imparts a reciprocatory movement to the rod 36 to operate the feeding mechanism in the manner described. Since the movement of the yoke 115, and therefore of the rods 117 and 36, is positive in both directions by reason of the fact that a cam roller 116 is provided at each side of the cam 114, the reason for providing a resilient connection, in the form of the spring 37, between the rod 36 and the oscillating member 35 will be apparent. By means of this resilient connection, the movement of the rod 36 to the left, as viewed in Figs. 2 and 5, and as effected by engagement of the cam 114 with the left-hand cam roller 116, as viewed in Figs. 2 and 9, is prevented from damaging the mechanism in any way in the event that the carton blanks should be already fed up to the delivering end of the magazine under an excessive pressure, and in the further event that the pressure regulating means for this feeding mechanism should fail to operate properly.

Referring again to Fig. 9 of the drawings, it will be seen that a cam 118 is secured to the sleeve 111 immediately above the yoke 115. Resting upon the upper surface of the cam 118 is a yoke 119 having bifurcations 120 embracing the sleeve 111. As shown in Figs. 2 and 9, the yoke 119 is secured to the left-hand extremity of the reciprocating rod 100, which, as above described, transmits reciprocating movement to the feeding fingers 92 for feeding the foremost carton blank out of the delivering end of the magazine 24. A roller 121 is pivotally secured to the lower surface of the yoke 119 to engage the periphery of the cam 118. This cam is provided with a plurality of protruding portions of such contour that the rod 100 is permitted to move to the left, as viewed in Figs. 2 and 9, under the influence of the spring 99 to cause the fingers 92 to feed the foremost carton blank in the magazine 24 out through the yoke 71 at a speed substantially equal to the speed of movement of the means included in the opening device 25 for taking the carton blanks from the magazine 24, as will be more fully described hereinafter. The number of protruding portions on the cam 118 will be equal to the number of carton blanks that are removed from the magazine during each revolution of the opening device.

A spider 122 is secured to the sleeve 111 at the upper extremity thereof. A bushing 123 of suitable material, preferably cast iron, is secured within an enlarged bore of the spider 122 above the upper extremity of the sleeve 111 and surrounds a sleeve 124, preferably of bronze, that is secured to the fixed shaft 105. The sleeves 123 and 124 are relatively closely fitted within one another to constitute a bearing surface for the upper portion of the rotating assembly carried by the sleeve 111 and the shaft 105, and also to serve as an air or vacuum valve for a purpose hereinafter described.

The hub portion of the spider 122 is provided with a plurality of integral projecting portions 125, each of which is bored to receive a tube 126 and counterbored for the reception of a packing gland 127 and an adjusting nut 128 for this packing gland. The gland 127 and nut 128 surround the tube 126 and are provided to form an air-tight connection between the tube 126 and the bore of the projecting portion 125, while, at the same time, permitting sliding movement of the tube within the bore of the projecting portion. The outer portion of the tube 126 is formed with an enlarged head 129 that is slidably mounted in a substantially U-shaped bracket 130 secured to the periphery of the spider 122 at the outer extremity of a corresponding spoke thereof, the top of the bracket being closed by a crossbar 130a.

The several brackets 130 and cross-bars 130a are preferably secured to the spokes of the spider 122 in each case by a bolt or machine screw 131 on one side of the bracket, and, on the other side of the bracket, by an upwardly extending square rod 132 which may have a screw-threaded reduced-diameter portion (not shown) extending downwardly through the bracket 130 and crossbar 130a and the corresponding spoke of the spider 122 to receive a suitable securing nut. The bolts or machine screws 131 may either extend freely through openings in the spokes of the spider 122 to receive securing nuts, or may be screw-threaded directly into the spokes of the spider 122.

Figure 10:
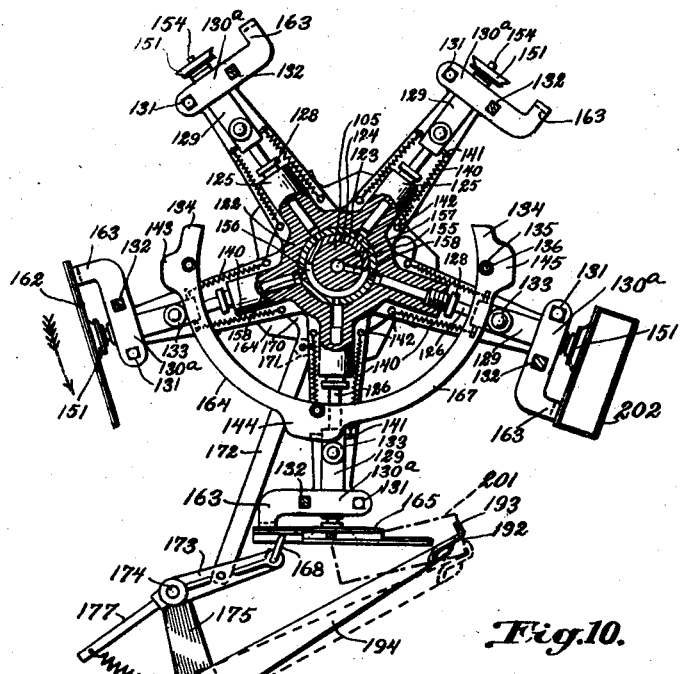
Fig. 10 is a view, partly in top plan and partly in horizontal section, taken along the line 10—10 of Fig. 9, and illustrating the operation of the carton opening mechanism.

On the top of the enlarged head 129 of each of the tubes 126, and near the inner extremity of this enlarged head, a cam roller 133 is pivotally mounted and engages a segmental cam 134 which is secured by machine screws 135 and collar members 136 in spaced relation below a disc 137 that is secured by means of a hub portion 138 and a set-screw 139 to the fixed shaft 105. The contour and position of the segmental cam 134 is best illustrated in Fig. 10, which also shows two tension springs 140 that are associated with each of the tubes 126 to bias the same inwardly to a position limited by engagement between the cam rollers 133 and the cam 134. Each of these tension springs 140 is connected at one end thereof to a pin 141 secured to the side of the corresponding head portion 129 of the tube 126 and at the other end thereof to a pin 142 located on the corresponding spoke of the spider 122 near the hub portion thereof. With this construction it will be seen that as the assembly carried by the sleeve 111 is rotated, the cam rollers 133 successively engage three protruding portions 143, 144 and 145 of the cam 134 to cause the tubes 126 periodically to be moved outwardly.

The outer portions of the head portions 129 are counterbored to a larger diameter than that of the inner portions of the tubes 126 and a coiled compression spring 146 is disposed within each of these counterbores. The inner extremity of each of these springs bears against the shoulder formed by the counterbore in the head portions of the tubes and the outer extremity surrounds a reduced-diameter portion 147 of a valve member 148 and bears against the shoulder formed by said reduced-diameter portion 147. The valve member 148 bears against a tubular seat member 149 that is externally screw-threaded to cooperat with corresponding internal screw-threads at the outer end of the counterbored portion of the head portion 129. A lock-nut 150 also threadedly engages the external screw-threads of the member 149 to secure the latter firmly in properly adjusted relation to the corresponding head portion 129. The outer extremity of each of the valve seat members 149 comprises a flange portion 149a against the inner surface of which a vacuum cup 151 formed of a disc of soft rubber or the like is pressed by a washer 152, which, in turn, is pressed outwardly by a nut 153 cooperating with the screw-threaded portion of the tubular member 149. A stem portion 154 of the valve member 148 projects outwardly through the bore of the tubular member 149 to permit opening of the valve by pressing the end of this stem portion inwardly. This stem portion is preferably cruciform in cross-section to leave openings for the passage of air therethrough, while at the same time providing bearing surface for guiding the sliding movement of the stem within the bore of the tubular member 149.

The fixed shaft 105 is provided with a transverse passageway 155 connecting a segmental port 156 in the sleeve member 124 with a vertical passageway 157 which extends downwardly to the lower portion of the shaft 105, where it is suitably connected with a vacuum tank or pump for a purpose to be hereinafter described. The sleeve 123 is provided with a plurality of ports 158, respectively, registering with the bores in the projecting portions 125 within which the tubes 126 are respectively slidably mounted as heretofore described. The ports 158 are in vertical alignment with the port 156 in the sleeve 124, whereby the tubes 126 are connected with the vacuum line during that part of the revolution of the spider 122 when the corresponding ports 158 are in register with the port 156 in the sleeve 124.

The left-hand end of the port 156, as viewed in Fig. 10, is so positioned that each of the tubes 126 is connected with the vacuum line just prior to the time when the corresponding vacuum cup 151 is about to be actuated into engagement with a carton blank to be picked up from the delivering end of the magazine, as will presently appear.

The operation of the feeding fingers 92 at the delivering end of the magazine is so synchronized with the rotation of the spider 122 carrying the vacuum cups 151 that the foremost carton blank in the magazine is pushed out in the direction of movement of the cups 151 and at substantially the same speed as that of the rotative movement of these cups. A substantially cylindrical roller 159 is pivotally mounted on a vertical axis provided by a pin 160 that is suitably secured to the frame of the magazine 24, as shown in Figs. 1, 2 and 4. This roller is located at the side of the magazine out of which the carton blanks are fed, and the forward surface of this roller is substantially in alignment with the plane of movement of the carton blanks during this feeding operation.

Figure 6:
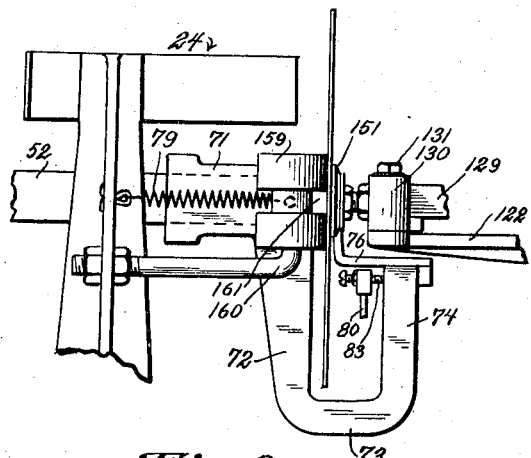
Fig. 6 is a fragmentary side elevational view of certain mechanism whereby the carton blanks are individually taken from the delivering end of the magazine by the opening device.

Thus, each carton blank is fed out over the front surface of the roller 159 and when it is positioned substantially at the center of the front surface of the roller 159, one of the vacuum cups 151 is actuated outwardly to engage the front surface of the carton blank. This outward movement of the vacuum cup 151 is caused by engagement of the corresponding cam roller 133 with the protruding portion 143 of the cam 134, which protruding portion is accurately positioned to effect such movement at this time. When the vacuum cup 151 is actuated toward the front surface of the carton positioned in front of the roller 159, the valve stem 154 first engages the front surface of the carton and is actuated inwardly toward the central shaft 105 against the action of the spring 146 to open this valve and connect the interior of the vacuum cup 151 with the vacuum line. The periphery of the vacuum cup 151 is then moved firmly into engagement with the front surface of the carton and the vacuum connection to the interior of the cup causes the carton blank to be pressed firmly against the cup. This condition is clearly illustrated in Fig. 6 of the drawings, which also shows how the construction of the yoke 71 provides clearance for the passage of the spider 122 and parts carried thereby, as well as for the feding of the carton blanks.

Figure 7:
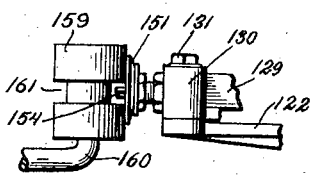
Fig. 7 is a fragmentary side elevational view of part of the mechanism shown in Fig. 6, illustrating the operation of this mechanism when no carton blank is fed out of the delivering end of the magazine to be received by the opening device.

During the outward actuation of the vacuum cup, it will be understood that the roller 159 serves as a support for the back surface of the carton blank which is freely movable thereover in a transverse direction by reason of the pivotal mounting of the roller 159. In order that this transverse movement may encounter minimum resistance, it is preferable although not essential, to provide a ball bearing mounting for the roller 159 on its pivotal support. In the event that no carton blank is fed out of the delivering end of the magazine to be picked up by one of the vacuum cups 151, the outer end of the valve stem 154 passes transversely through the space formed by a reduced-diameter portion 161 of the roller 159, as shown in Fig. 7. Thus, the valve 148 is not opened unless a carton blank is positioned over the roller 159 to be picked up by the corresponding vacuum cup 151, and in this manner the minimum necessary drain is imposed upon the vacuum supply.

When a carton blank has been picked up by the vacuum cup 151 in the manner described above, the atmospheric pressure on the outer surface thereof maintains the same firmly in engagement with the vacuum cup and holds the corresponding valve 148 open to maintain the vacuum connection to the interior of the cup. In this connection it will be understood that the spring 146 applies only a relatively slight outward biasing force to the valve 148 and stem 154, whereby this valve may be easily maintained in this open position by the atmospheric pressure on the outer surface of the carton blank.

In connection with the showing of Fig. 2, it may be stated that the longitudinal center line of the magazine 24 may be subject to slight variations with respect to the horizontal center line of the opening device 25, because the magazine is not ordinarily secured in fixed relation to the packaging machine itself, but is independently set up on legs or standards 24a and may be secured to the machine by adjustable brackets or other suitable means (not shown), as desired. It is for this reason that the rods 36 and 117 and the rod 100 are shown broken. It will be apparent that the yokes 115 and 119, which constitute the sole operative connections between the magazine 24 and the opening device 25, are so associated with the opening device that the entire magazine may be moved to a limited extent about the vertical center line of the opening device as a pivotal axis, the roller 159 being so disposed as to accommodate slight variations in the direction of approach of the vacuum cups 151. In actual practice, the magazine may be moved slightly in this manner until the most satisfactory operating conditions are obtained, and may then be secured in the position giving these results, which is usually found to be such that the extended horizontal center line through the opening device 25, as viewed in Fig. 2, passes somewhere between the axis of the roller 159 and the edge of the magazine out of which the carton blanks are fed.

Fig. 10 of the drawings shows a collapsed carton blank 162 that has been picked up by one of the vacuum cups 151, in a position assumed by such blank shortly after the same has been picked up by the vacuum cup. This figure also shows the manner in which one of the outer edges of the carton blank so engaged by the vacuum cup may be supported by one of a plurality of bracket members 163 that are preferably integral with the cross-bars 130a of the brackets 130.

In the position in which the carton blank 162 is illustrated in Fig. 10, the corresponding cam roller 133 has passed beyond the protruding portion 143 of the cam 134 to permit the tube 126 and the vacuum cup 151, carrying the said carton blank, to be retracted by the action of the tension springs 140. Rotative movement of the spider 122 then continues in a counterclockwise direction, as viewed in Fig. 10, during which movement the cam roller 133 passes over a dwell 164 on the stationary cam 134. At a predetermined angular position of the rotating mechanism, the cam roller 133 engages the second protruding portion 144 of the cam 134, which causes the tube 126 and corresponding vacuum cup 151 again to be actuated outwardly. A carton blank which has been so actuated outwardly is indicated by the reference character 165 in Fig. 10.

In the event that carton blanks having ears of unequal length are being utilized in the machine with which the feeding device of the present invention is associated, these blanks are preferably so placed in the magazine 24 that one of the shorter ears of each carton blank lies in front of one of the longer ears. During the time that one of the cam rollers 133 is passing over the dwell 164 of the cam 134, the corresponding one of a plurality of opening knives 166, one of which is associated with each of the vacuum cups 151, as shown in Fig. 1, is permitted to drop a sufficient distance that the lower extremity of such knife is positioned in front of the rearward longer ear of the blank. It is while the knife is so positioned, that the cam roller 133 comes into contact with the protruding portion 144 of the cam 134, and the tube 126 and the vacuum cup 151 and carton blank carried thereby are again actuated outwardly. The longer ear of the blank is thus brought into contact with the back of the opening knife 166 and is bent backwardly a slight distance. The opening knife 166 is then permitted to drop further so that it comes between the main walls of the carton blank to separate the same a substantial distance, this separation being facilitated by a receding of the carton blank as the cam roller 133 leaves the protruding portion 144 of the cam 134 and passes onto a dwell 167 of said cam. In this manner, the main walls of the carton blank are separated from each other to facilitate the recollapsing of the blank in a manner hereinafter described. The mechanism for effecting the above-described operation of the opening knives 166 is also fully described hereinafter. If desired, the blanks may be placed in the magazine in the reverse manner of that described, which condition may be accommodated simply by utilizing a cam 134 of modified contour, as will be readily understood.

In the event that carton blanks having ears of equal length are utilized, which condition is illustrated in the drawings, it is necessary to provide additional means for initially separating the ears at the top of the blank about to be opened. This is accomplished by engagement of the inwardly bent upper extremity of a rod 168, shown in Figs. 1 and 10, which bent upper extremity is adapted to be moved inwardly against the trailing narrow ear of the carton blank to deflect this ear and the broad ear on the back of the blank inwardly toward the central shaft 105 substantially in the manner shown in Fig. 10.

Figure 11:
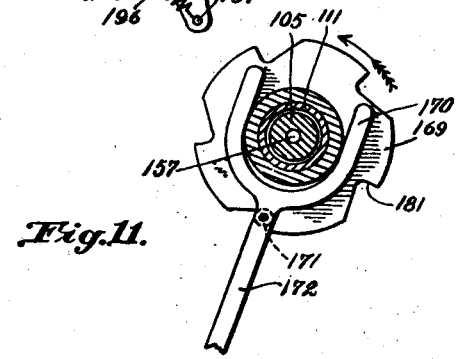
Fig. 11 is a fragmentary view, partly in top plan and partly in horizontal section, taken along the line 11—11 of Fig. 9, and illustrating a cam and associated means for actuating certain of the carton opening mechanism.

The inward movement of the rod 168 is effected by means of a cam 169, which is shown in top plan view in Fig. 11, and in vertical section in Fig. 9. Reference to Fig. 9 will show that this cam is secured to the rotatable sleeve 111 below the spider 122. A bifurcated yoke 170 embraces the sleeve 111 and rests upon the upper surface of the cam 169, this yoke being provided on its lower surface with a pivotally mounted cam roller 171 adapted to engage the periphery of the cam 169.

The yoke 170 has an arm 172 extending outwardly therefrom and pivotally connected at its outer extremity to an intermediate portion of a lever arm 173 (Figs. 1 and 10), upon the outer extremity of which lever arm the rod 168 is supported. The lever arm 173 is mounted upon a pivot 174 carried by the inner extremity of a fixed arm 175, which, in turn, is supported by a fixed vertical shaft 176. As shown in Fig. 1, the shaft 176 is supported upon the bed plate 21 of the packaging machine. A lever arm 177 is rigid with the lever arm 173 and extends from the pivot 174 in a direction that is substantially opposite to the direction in which the lever arm 173 extends from said pivot. A tension spring 178 is connected at one extremity thereof to the outer end of the lever arm 177, and the other extremity of said spring is connected to a pin 179 that is carried by a collar member 180 whereby the fixed arm 175 is secured to the vertical shaft 176.

By the above-described construction, it will be seen that the rod 168 is biased inwardly at all times by the spring 178, and that it is normally held outwardly by the action of the cam 169 upon the cam roller 171 of the yoke 170. The cam 169 is provided with a plurality of notches 181 which permits the rod 168 to more inwardly at predetermined periods. It will be noted that the forward faces of the notches 181 are very steep, whereby the inward movement of the rod 168 is effected rapidly at the desired periods.

When the equal-length ears of a carton blank are thus separated by the action of the rod 168, the corresponding opening knife 166 is permitted to enter between the main walls of the blank in the manner heretofore described for the opening of blanks having ears of unequal lengths.

As above stated, an opening knife 166 is provided for each of the vacuum cups 151. Each of these knives is carried by a collar member 182 that is freely slidable on the corresponding one of the vertical rods 132, heretofore referred to. These rods are connected at their upper extremities to a spider 183, as shown in Fig. 1, having a hub portion 184 that is bored to permit the extension of the upper extremity of the shaft 105 therethrough. This bore is of such size as to permit a free running fit between the same and the shaft 105, whereby this shaft provides a bearing for the spider 183 and serves to maintain the vertical rods 132 in their proper aligned positions.

Each of the collar members 182 carries on its inner surface a cam roller 185 that is pivotally mounted on a horizontal axis extending substantially radially with respect to the shaft 105. This cam roller is adapted to rest, by reason of the action of gravity upon the knife, collar and roller, upon the upper surface of a cylindrical cam 186. This cam is provided with suitable spokes 187 connecting the periphery of the cam with a hub 188, which is fixed to the shaft 105 by a setscrew 189, or other suitable means. The cam 186 is thus held stationary.

A drop 190 in the cam 186 is so positioned as to permit each of the opening knives 166 to drop in front of the rearward ears of the collapsed carton blanks after the blanks have been retracted by the corresponding vacuum cup 151 by reason of the movement of the corresponding cam roller 133 onto the dwell 164 of the cam 134. The cam 186 has a further drop 191 which permits the opening knife 166 to enter between the main walls of the carton blank after the knife has entered between the upper ears of the blank as above described, and the blank has been retracted toward the central shaft 105 when the cam roller 133 passes from the protruding portion 144 onto the dwell 167 of the cam 134.

When the opening knife 166 enters its maximum distance between the main walls of the carton blank, these walls are sufficiently separated that the carton may be re-collapsed by applying force to the forward folded edge of the blank. This force is applied by means of a plate 192 having an inwardly projecting portion 193 lying in the path of rotation of the carton blank. This plate is carried by the right-hand extremity, as viewed in Figs. 1 and 10, of a rod 194, which rod is pivotally mounted upon the upper extremity of the fixed vertical shaft 176.

A lever arm 195, which is rigid with the rod 194, extends from the pivotal connection of the rod 194 with the shaft 176 in a direction substantially opposite to the direction in which the rod 194 extends from said shaft, and one end of a tension spring 196 is connected to an intermediate portion of this arm 195. The opposite end of the spring 196 is connected to a pin 197 carried by the outer extremity of a fixed arm 198, which is supported by the fixed shaft 176. In this manner the plate 192 is biased inwardly by the action of the spring 196. The extent of this movement is limited by engagement of the extremity of the arm 195 with a stop pin 199 that is carried by a fixed arm 200 which is preferably integral with the arm 198.

When the forward edge of the carton blank comes into contact with the inwardly extending portion 193 of the plate 192, this contact serves to hold this edge of the carton, while the forward movement of the rear wall thereof is continued by reason of the continuous rotation of the vacuum cup 151. The carton blank is thus folded along its vertical edges until it comes into substantially rectangular cross-section, as indicated in broken lines at 201 in Fig. 10. The front wall of the carton being moved outwardly by this opening of the blank, necessitates a slight outward movement of the plate 193, which is permitted by the resiliency of the spring 196. The position to which the plate 192, the supporting rod 194, and the lever arm 195 may be moved by this action is indicated by the broken lines in Fig. 10. Continued movement of the carton blank after it has been opened to its rectangular shape as indicated by the broken line 201, causes the blank to be recollapsed along its two vertical edges other than the two edges along which it was originally collapsed. This recollapsing is effected by the continued engagement of the hooked extremity 193 of the plate 192 with the blank as the same is moved past such plate.

After the recollapsed carton blank has been moved by the corresponding vacuum cup past the plate 192, this plate is returned to its initial position by the action of the spring 196, and the carton blank springs back to substantially rectangular cross-section, as illustrated by the blank 202 in Fig. 10. This open blank is now ready to be placed upon one of the blocks 23 of the packaging machine. Preparatory to such placement of the blank, the corresponding cam roller 133 comes into contact with the protruding portion 145 of the cam 134, which causes the blank again to be moved outwardly with respect to the central shaft 105. At this point the transfer device 26 comes into operation to receive the opened blank from the opening device, and therefore the details of construction of the transfer device will now be described.

Referring to Figs. 1, 12 and 13, it will be seen that a plurality of vertical rods 203, which are preferably of square cross-section, are secured to the upper surface of the sprocket-wheel 28 of the transfer device 26, and are supported at their upper extremities by a spider 204. Both the sprocket-wheel 28 and the spider 204 are rotatably mounted on a fixed vertical shaft 205 that is suitably supported by a portion of the frame 107 in a manner similar to that in which the vertical shaft 105 is supported. A thrust bearing 206 is disposed between the portion of the frame 107 which supports the shaft 205 and the bottom of the hub portion 28a of the sprocket-wheel 28, and a plurality of bearing rollers 207 are disposed between the fixed shaft 205 and the bore of said hub portion 28a to provide a suitable radial bearing for the wheel 28. The upper ends of the bearing rollers 207 are maintained in proper position by a collar member 208 disposed within a counterbored opening at the top of the hub portion 28a and secured in this position by a set screw 209.

Upon each of the vertical rods 203 a freely slidable collar 210 is disposed. Each of these collars carries two cross members 211 each having journal portions 211a at its outer extremities to provide pivotal support for two vertical shafts 212. Each of these shafts 212 carries a plurality of hooked members 213 which form a cage for receiving the open carton blanks from the opening device 25, as will presently appear. A beveled pinion 214 is secured to the lower extremity of each of the vertical shafts 212, and these pinions mesh with beveled gear wheels 215 that are secured to a transverse shaft 216. The shaft 216 is journaled in two lugs 217 depending from the lower one of the cross members 211. A crank arm 218 is fixed to the transverse shaft 216 and extends inwardly toward the central shaft 205. A cam roller 219 is pivotally mounted at the inner extremity of the crank arm 218 and is adapted to engage a segmental fixed cylindrical cam 220 having a hub portion 221 that is secured by a set screw 222 to the fixed shaft 205. The proper spacing between the hub portion 28a of the sprocket-wheel 28 and the hub 221 of the cam 220 may be secured by the provision of a collar member 223 secured to the shaft 205 by a set-screw 224.

The opposite sides of each of the cages formed by the hooked members 213 are biased toward each other by a tension spring 225 suitably secured to said members, and these sides of each cage are adapted to be separated by coaction between the cam roller 219 and the cam 220.

The vertical position of each of the cages with respect to the guide rods 203 is governed by a cam roller 226 that is pivotally mounted on the back of the corresponding sliding collars 210 carrying the cage assembly. These cam rollers 226 are disposed between two cylindrical cams 227 and 228, respectively having hub portions 229 and 230 secured by set-screws 231 and 232 to the fixed vertical shaft 205.

The fixed cams 227 and 228 are so proportioned and mounted that the cages formed by the hooked members 213 are at the proper elevation to receive the opened carton blanks from the opening device when these cages come into tangential alignment with the cartons carried by the vacuum cups 151 of the opening device. When one of these cages comes into such alignment with an opened carton blank, such as that shown at 202 in Fig. 10, said blank is moved outwardly away from the central shaft 105 of the opening device 25 by engagement of the corresponding cam roller 133 with the protruding portion 145 of the fixed cam 134. This outward movement brings the open blank between the hooked members 213 of one of the cages, which hooked members are held apart at this point in the cycle of their operation by the action of the cam roller 219 and cam 220, as indicated by the broken-line position of the crank arm 218 and roller 219 in Fig. 12. When the blank is thus positioned, the roller 219 is moved past the end of the fixed cam 220, permitting the hooked members 213 to be drawn together by the tension spring 225 and resulting in the movement of the arm 218 and roller 219 to the full-line position shown in Fig. 12. These hooked members thus grasp the opened carton blank carried by the vacuum cup 151 of the opening device 25, and at this instant the connection between the inside of the vacuum cup 151 and the vacuum tank or pump is broken by reason of the movement of the corresponding port 158 past the right-hand end of the port 156, as viewed in Fig. 10. With the vacuum thus cut off and the blank grasped by the cage 213, the vacuum cup 151 is again retracted toward the central shaft 105 of the opening device, causing said cup to disengage the blank and leave the same in the cage 213 where it is supported from the rear by the cross-members 211, and the remaining operations in placing said blank on one of the blocks 23 of the packaging machine are performed by the transfer device 26.

When an open carton blank has been placed in one of the cages 213, as above described, the continued rotation of the sprocket-wheel 28 of the transfer device 26 by the action of the chain 22 causes the vertical guide rods 203 and the collar members 210, carrying the carton-holding cages, to be similarly rotated. Such rotation, which is from right to left in the foreground, as viewed in Fig. 12, causes the cage which has just taken an opened blank from the opening device 25 to move downwardly along the guide rod 203 by reason of the downward inclination of the fixed cams 227 and 228 in this segment of their periphery.

The cages are so disposed radially of the sprocket-wheel 28 that they are in exact alignment with the blocks 23 carried by the chain 22 as this chain passes around the periphery of sprocket-wheel 28. Thus, the downward movement of a cage carrying an opened carton blank causes such opened blank to be moved downwardly over a corresponding block 23. It will be understood that this positioning of the open blanks on the blocks 23 can be readily effected, since the blanks are moving in exact synchronism with the blocks upon which they are to be placed. When a blank has been placed in its proper position upon one of the blocks 23, the cam roller 219 of the cage carrying such blank comes into contact with a sloping end portion 233 of the fixed cam 220. The corresponding crank arm 218 is thereupon raised to open up the cage formed by the hooked members 213, this opening being accomplished by operation of the gear wheels 215 upon the pinions 214 secured to the lower extremities of the shafts 212. Upon opening of the cage in this manner, the carton blank is fully released therefrom and is left free to continue through the packaging machine with the block 23 upon which it has been placed. A blank which has just been released by one of the cages is shown at 234 in Fig. 1 and the one preceding it, which is continuing on its path of movement around or through the packaging machine is shown at 235 in the same figure. The cage is maintained in its open position by the cam 220 until it has been raised to the position in which it was initially described, i. e., where it is ready to receive another blank from the opening device 25 in the same manner.

The foregoing description covers the normal operation of the feeding mechanism whereby the collapsed carton blanks are successively taken from the magazine 24 and placed upon the blocks 23 of the packaging machine after said blanks have been opened and recollapsed by the heretofore-described operation of the opening device 25. It will be understood that all of these operations are entirely automatic and may be continued indefinitely as long as a supply of carton blanks 30 is maintained in the magazine 24.

During the normal operation of the packaging machine itself, the carton blanks are automatically removed from the blocks 23 in any desired manner, at some point along the path of movement of the chain 22 which precedes the return of the blocks to the vicinity of the feeding mechanism. Occasionally, however, the means whereby the carton blanks are removed from the blocks 23 may fail to function properly and one of the blanks may remain on one of the blocks 23 when such block returns to the vicinity of the feeding mechanism and is about to be supplied with another blank in the normal manner. If one of the cages 213 of the transfer device 26 should be supplied with an opened carton blank from the opening device 25, and should attempt to place such open blank upon a block 23 from which the blank last supplied thereto has not been properly removed, the transfer mechanism might be thrown out of adjustment or other undesirable results might be produced. In any event, such an operation would result in wastage and disfiguration of the carton blanks and in the accumulation of torn blanks or portions thereof around the packaging machine and the feeding mechanism. It is obvious that these conditions are most undesirable, and the present invention comprises means for preventing the same, which means will now be described.

Fig. 14 shows in detail the construction of the blocks 23 for cooperation with certain protective mechanism to prevent the occurrence of the above-mentioned undesirable conditions, and Figs. 15 and 16 show details of a preferred form of such protective mechanism. As shown in Fig. 14, a groove or slot 236 extends transversely across the body of each of the blocks 23 and at an intermediate level thereon. The face of the block in which this groove is provided is that which is presented outwardly with respect to the packaging machine itself and toward the opening device 25, this relation being illustrated in Fig. 1 of the drawings.

It will also be noted from an examination of Fig. 14 that the base portion of the block 23 comprises extended lugs 237 having holes therethrough for the reception of bolts or cap screws for securing the block to the chain 22. A bracket member 238 is secured to one face of the block 23 and serves to prevent the carton blanks from being positioned too far downwardly on the block.

Referring to Fig. 15, a finger 239 is pivotally mounted upon a vertical shaft 240 that is supported by a bracket member 241 secured to the side of the bed plate 21 of the packaging machine. This finger 239 is slightly narrower than the grooves 236 in the blocks 23 and is mounted at the level of these grooves when the blocks 23 are mounted on the chain 22. A rod 242 comprises a downwardly bent extremity pivotally engaging an opening in a lug portion 239$^a$ of the finger 239 and said rod extends transversely of the magazine 24 and under said magazine to certain mechanism for controlling the operation of the feeding fingers 92, which have been described heretofore.

This controlling mechanism is mounted on a bracket member 243 that is suitably secured to the frame of the magazine 24. A vertical shaft or pin 244 is journalled in the forward or left-hand extremity of the bracket member 243 and has secured to its lower extremity a lever arm 245. A pin 246 extends through an opening in the outer extremity of the lever arm 245 and is held in place therein by a cotter pin 247 or other suitable means. The lower portion of the pin 246, beneath the lever arm 245, is formed with an enlarged block or head portion 246a, through which the extremity of the rod 242, opposite that extremity of said rod which is connected to the finger 239, extends. The said opposite extremity of the rod 242 is screw-threaded to receive a securing nut 248. Surrounding the end portion of the rod 242 adjacent the block portion 246a, and extending from said block portion to a collar member 249 that is suitably secured to the rod 242, is a coiled compression spring 250 which is provided for a purpose hereinafter described.

The upper extremity of the vertical shaft or pin 244 has secured thereto a lever arm 251 having a latching portion 251a near the outer extremity thereof. This latching portion 251a is adapted to engage a segmental latching member 252 that is suitably secured to the lower extremity of the vertical shaft 98, heretofore described. It will be remembered that the shaft 98 is that which supports the lever arms 95 and 96 carrying the carton feeding fingers 92.

A rod 253 is bent downwardly at its left-hand extremity as viewed in Figs. 15 and 16, and this downwardly extending portion pivotally engages an opening through the lever arm 251 at an intermediate portion thereof. The lower extremity of this downwardly bent portion of the rod 253 has connected thereto one end of a tension spring 254, the other end of which is suitably secured to a lug portion 243a of the bracket member 243. The opposite extremity of the rod 243 extends in slidable relation through a suitable opening in the lug portion 243a, which thus supports the said opposite extremity of said rod. A collar or stop member 255 is suitably secured to an intermediate portion of the rod 253 and determines the extreme right-hand position of this rod as viewed in Figs. 15 and 16.

A lever member 256 having a handle portion 256a at the outer extremity thereof is pivotally mounted upon a horizontal bolt or pin 257 extending transversely with respect to the magazine 24 and supported by the frame of the magazine and the bracket member 243. Two lever arm portions 256b and 256c are preferably integrally formed with the lever arm 256. The lever arm 256b is adapted to engage the right-hand extremity of the rod 253 when the handle portion 256a is moved to the left as viewed in Figs. 15 and 16, and the lever arm 256c is adapted to engage the lower extremity of the lug portion 243a to limit the movement of the handle portion 256a to the right.

The tension spring 254 biases the rod 253 and the lever arm 251 to the right and tends to maintain the latching portion 251a of said lever arm out of engagement with the latching member 252. This biasing effect of the spring 254, may be overcome either by actuation of the rod 242 downwardly, as viewed in Fig. 15, or by movement of the handle portion 256a to the left. When the said handle portion is moved in this manner, its center of gravity is transferred to the left-hand side of its pivotal mounting on the bolt or pin 257, and the weight of said handle portion and the lever arm carrying the same is sufficient to maintain the tension spring 254 in extended condition, which results from engagement of the lever arm 256b with the right-hand extremity of the rod 253, the said rod 253 being thus moved to the left to actuate the latching portion 251a of the lever arm 251 into latched engagement with the latching member 252. Such a latched condition is illustrated in Figs. 15 and 16, but it is effected by the rod 242 and associated parts, rather than by the handle portion 256a, which is normally permitted to remain in its right-hand position, as shown in the drawings. It is likewise maintained in this position by the action of gravity, since its center of gravity is then on the right-hand side of the pivotal mounting of the lever arm 256.

As above stated, the latching portion 251a of the lever arm 251 is also adapted to be actuated into engagement with the latch member 252 in response to the actuation of the rod 242, and this is the condition which causes the latched engagement illustrated in the drawings.

The biasing effect of the spring 254 normally maintains the rod 242 in such position that the blocks 23 pass freely by the finger 239 by reason of the clearance provided by the grooves 236 in said blocks. However, in the event that one of the blocks 23 is still carrying a carton blank as it approaches the feeding mechanism and is about to have another blank placed thereon, the blank remaining on the block engages the outer extremity of the finger 239 and actuates said finger downwardly, as viewed in Fig. 15. In this figure, an unremoved blank 258 is shown on one of the blocks 23, and the side wall of this blank, which covers the groove 236 in the block 23, has engaged the finger 239 to actuate the rod 242 toward the opposite side of the magazine, where the protective mechanism is mounted. This movement of the rod 242 results in the actuation of the lever arm 251 through the agency of the lever arm 245 and the vertical shaft or pin 244, to effect engagement of the latching portion 251a with the latching member 252 as shown, because the compression spring 258, which transmits the force required for such actuation, is considerably stiffer than the restraining spring 254.

The object in transmitting this force through the spring 258 rather than utilizing a positive connection between the rod 242 and the lever arm 245 is to prevent damage to the mechanism or mutilation of the unremoved carton blanks in the event that the movement of the lever arm 251 into latching position is obstructed for any reason, such, for example, as by the segmental latching member 252 being out of its normal position when the latching impulse is received.

It will be remembered that the vertical shaft 98 is periodically oscillated during the normal operation of the feeding mechanism by reason of the action of the cam 118 upon the roller 121, which roller is secured to the yoke 119 connected to the left-hand extremity of the rod 100. The movement of the shaft 98 in a counterclockwise direction, as viewed in Fig. 15, is effected by the movement of a rising portion of the cam 118 past the roller 121, while the clockwise movement of the shaft 98 is effected by the biasing action of the tension spring 99, as shown in Figs. 2 and 4 and as heretofore described.

The clockwise movement of the shaft 98 results in the actuation of the feeding fingers 92 across the delivering end of the magazine 24 to feed the foremost carton blank out of this end of the magazine, and it is this movement which is adapted to be arrested by the protective mechanism just described. It will be seen that when the latching portion 251a of the lever arm 251 is in latched engagement with the segmental latching member 252, as shown in Figs. 15 and 16, the spring 99 will be ineffective to cause the said feeding action of the fingers 92, and these fingers will be maintained stationary as long as this latched condition is maintained. During this interval, the roller 121 does not follow the cam 118, but is held near its extreme outward position with respect to the central shaft 105 of the opening device 25, while an indented portion of the cam 118 passes thereby. It is in order to permit this mode of operation that the spring 99 is provided for effecting the feeding operation of the fingers 92, rather than providing positive actuating means for said fingers.

With the foregoing description in mind, it will be understood that the finger 239 is so positioned that it will be engaged by the unremoved blank 258 carried by one of the blocks 23, just prior to the instant when the carton blank that is normally predestined to be placed upon said block 23 is to be fed out of the magazine 24. As the feeding movement of the fingers 92 to actuate the said blank out of the magazine 24 is initiated, the latching member 252 comes into engagement with the latching portion 251a of the lever arm 251, which has been actuated into latching position as above described.

Further feeding movement of the fingers 92 is thus prevented, and the foremost carton blank in the magazine will not be fed out through the yoke 71 at this instant. The vacuum cup 151 of the opening device which was about to receive this blank from the magazine will not, therefore, come in contact with said blank, and the outer extremity of the valve stem 154 will pass through the slot formed by the reduced diameter portion 161 of the roller 159, as illustrated in Fig. 7. This vacuum cup will thereafter come into synchronism with one of the cages 213 of the transfer device 26, and, therefore, this cage will not receive a carton blank to be placed upon the corresponding block 23. This block 23 is the one from which the blank last placed thereon has not been removed, and accordingly the desired protection is obtained.

After the latching engagement between the latching portion 251a of the lever arm 251 and the segmental latching member 252 has been established in response to the engagement of the finger 239 with the unremoved blank 258, this latched engagement is maintained until the next peak of the cam 118 engages the roller 121, because of the friction of the engagement between the latching member, which friction is of a considerable magnitude by reason of the pressure exerted by the feeding spring 99 after the cam 118 has moved away from the roller 121. If desired, the latching faces of the members 251 and 252 may be undercut slightly to insure their remaining in latched engagement in the manner described, although it may be found in actual practice that this undercutting is not essential.

It will be understood that the lever arm 251 is maintained in latching position by the engagement of the finger 239 with the unopened blank 258 at least until the cam 118 has moved away from the roller 121, at which time the full force of the feeding spring 99 is brought to bear upon the latching surfaces to maintain the latched condition. As the cam 118 again engages the roller 121 just in advance of the next peak of said cam, the latching member 252 is rotated a very slight distance in a counterclockwise direction as viewed in Fig. 15, and this movement releases the latching arm 251 to permit the spring 254 to return the latching mechanism to its normal unlatched position, it being assumed that the handle portion 256a remains in its right-hand position and that the next succeeding block 23 is not occupied by an unremoved carton blank. If said block is so occupied, however, the return of the latching mechanism to unlatched position will be prevented during the interval allowed for the feeding out of the next carton blank in the mechanism, and the operation last above described will be repeated. In the normal operation of the packaging machine, however, the unoccupied blocks 23 pass freely by the finger 239 by reason of the clearance provided by the grooves 236 in said blocks, as previously described.

The handle portion 256a is provided to permit the operation of the feeding fingers 92 to be suspended at the will of an operator or inspector. When this handle is moved to its left-hand position, the lever arm 251 is actuated to latching position through the agency of the rod 253, and this condition is maintained until the handle is returned to its right-hand position. During this time the feeding mechanism may be operated for inspection or other purposes without the passage of carton blanks therethrough.

The modified form of protecting mechanism illustrated in Figs. 17, 18 and 19 comprises means for interrupting the operation of the opening mechanism 25 rather than preventing the supplying of carton blanks to the vacuum cups 151 of said opening mechanism. This interruption in the operation of the opening mechanism is effected by a clutch mechanism interposed between the driving sprocket wheel 27 of the opening mechanism and the rotatable sleeve 111 of said mechanism, by means of which sleeve the moving parts of the opening mechanism are actuated as previously described. The protective mechanism is so positioned as to time the interruptions in the movement of the opening mechanism to permit one of the cages 213 of the transfer device to come into tangential alignment with a space between two adjacent vacuum cups 151 of the opening device, in which space there will obviously be no carton blank to be received by said cage. Therefore, this cage will be empty as it is moved downwardly over the block 23 from which the blank last supplied thereto has not been removed, and the same protective feature is obtained as with the preferred form of protective mechanism first described.

The fundamental difference between the two forms of protective mechanism, therefore, is that in the preferred form no blank is fed out of the magazine 24 when the block that is predestined to receive the foremost blank in said magazine carries a blank which has not been removed, while in the modified form of mechanism the cage 213 of the transfer device which is about to receive an opened carton blank from the opening device 25, passes through the space between two adjacent vacuum cups of the opening device without receiving an opened blank therefrom.

Referring to Fig. 17, it will be seen that the sprocket wheel 27 of the opening device 25 is provided with a modified hub portion 27b. The lower part of this hub portion is provided with the bore 110, in which the rollers 109 are disposed exactly as in the case of the form of hub portion 27a shown in Fig. 9. Instead of being secured directly to the reduced diameter portion 111a at the lower extremity of the rotatable sleeve 111, however, the upper part of the hub portion 27b is provided with a bore 259 within which a driving member 260 of the clutch mechanism is disposed and firmly secured as by a key 261 (Fig. 19). This driving member 260 is of annular form and has in its inner surface a plurality of grooves 262 of substantially rectangular cross-section and extending parallel to the axis of rotation of said member.

A driven member 263 of the clutch mechanism is bored to receive the reduced diameter lower extremity 111a of the rotatable sleeve 111 and is firmly secured thereto by a key 264 or other suitable means. The driven member 263 has a reduced diameter portion 263a extending within the bore of the annular driving member 260 and having a free running fit with respect thereto. The bottom surfaces of the reduced diameter portion 111a of the sleeve 111 and of the reduced diameter portion 263a of the driven member 263 of the clutch mechanism rest upon a suitable thrust bearing 265 that is disposed within a bore 266 provided in the hub portion 27b for that purpose. The thrust bearing 265 thus facilitates relative rotation between the driving and driven members of the clutch mechanism and of the parts respectively secured thereto.

A clutch dog 267 comprises a horizontally extending arm portion 267a that is disposed within a segmental cavity 263b in the upper surface of the driven member 263 of the clutch mechanism. The dog 267 also comprises a cylindrical portion 267b which extends downwardly in rotatable relation to an opening in the driven member 263, which opening is located at the inner extremity of the segmental cavity 263b and which emerges at such position that only a portion thereof intersects the reduced diameter portion 263a of said driven member.

The lower part of the downwardly extending portion 267b of the clutch dog is machined off on a radius equal to that of the inside of the annular driving member 260, which results in substantially half of the lower extremity of this downwardly extending portion being removed to form an engaging portion 267c, the cross-section of which is the same as that of that portion of the hole through the driven member 263 which lies within the reduced diameter portion 263a of said driven member. The direction of extension of this machined surface of the portion 267c is such that its radius of curvature at its mid-plane is substantially in line with the longitudinal center line of the horizontally extending portion 267a of the clutch dog.

The segmental cavity 263b in the upper surface of the driven member 263 is bounded at its rearmost extremity with respect to the direction of rotation indicated by the arrow in Fig. 18; i. e., its lower extremity as viewed in said figure lies in a plane parallel to the plane extending through the axis of the shaft 105 and the axis of rotation of the clutch dog 267 and is spaced therefrom a distance equal to half the width of the horizontally extending portion 267a of the clutch dog 267. Therefore, when the clutch dog 267 is rotated about the pivot formed by the engagement of the downwardly extending cylindrical portion 267b of said dog with the hole through the driven member 263, to its extreme position in a clockwise direction as viewed in Figs. 18 and 19, the machined outer surface of the engaging portion 267c of the clutch dog constitutes a segment of a cylindrical surface which extends as a direct continuation of the cylindrical outer surface of the reduced diameter portion 263a of the driven member 263 and of the adjacent inner cylindrical surface of the annular driving member 260. It will be apparent that when the clutch dog 263 is so positioned as to place the engaging portion 267c thereof in this relation, the driving member 260 and the driven member 263 are freely rotatable with respect to each other.

When the clutch dog 263 is rotated about its pivotal axis in a counterclockwise direction as viewed in Figs. 18 and 19, from the free running position just described, the lower and right-hand corner of the engaging portion 267c is moved outwardly to the position indicated in Fig. 19, where this corner of the said engaging portion lies within one of the grooves 262 in the inner surface of the driving member 260 and engages the rearward surface of said groove with respect to the direction of rotation of the parts. This is the normal position of the clutch dog whereby a driving relation is maintained between the driving member 260 and the driven member 263, and the clutch dog is normally maintained in this position by a coiled compression spring 268, one extremity of which is seated in a suitable depression or cavity in one side of the horizontally extending portion 267a of the clutch dog 267, and the other extremity of which extends within a transverse bore 269 in the driven member 263 and abuts against a set screw 270, which threadedly engages internal screw-threads in a counter-bored outer portion of said bore. The spring 269, therefore, biases the clutch dog 267 toward the engaging position in which this dog is illustrated in Figs. 17, 18, and 19.

The clutch dog 267 is adapted to be actuated out of its normal position, in which it effects a driving engagement between the driving member 260 and the driven member 263, by an annular plate or disc 271 having a central bore 271a of such diameter as to provide a free running fit with respect to the rotatable sleeve 111 about which sleeve said plate 271 is disposed. A pin 272 is secured to the horizontally extending portion 267a of the clutch dog 267 near the outer extremity thereof, and projects upwardly above the upper surface of said dog a distance substantially equal to the thickness of the plate 271, in which a radially extending slot 271a is provided for the reception of this projecting portion of the pin in freely slidable relation. It will be seen, therefore, that the plate 271 normally rotates with the driven member 263 of the clutch in the angular position with respect thereto that is indicated in Fig. 18, but that a certain amount of relative rotation between the driven member 263 and the plate 271 is permitted by reason of the fact that the clutch dog 267 may be rotated to a certain extent within the cavity 263b in the driven member 263.

During this relative rotation the pin 272 slides in the slot 271a in the plate 271, since the axes of rotation of the dog 267 and the plate 271 are displaced from each other, and the reason for providing the slot 271a thus becomes apparent.

When the mechanism is operating under normal conditions with the clutch dog 267 in the position indicated in the drawings to establish a driving connection between the driving member 260 and the driven member 263 of the clutch the spring 268 serves to maintain the plate 271, as well as the clutch dog 267, in the relative angular position indicated, by reason of the engagement of the upwardly projecting portion of the pin 272 with the side walls of the radial slot 271a in said plate.

When it is desired to discontinue the driving engagement between the driving member 260 and the driven member 263 of the clutch mechanism, it is only necessary to stop the rotation of the plate 271. When this plate is so arrested, the members 260 and 263 continue to rotate a short distance, during which rotation the outer extremity of the horizontally extending portion 267a of the clutch dog 267 is held stationary. After this short interval of rotation of the members 260 and 263, the rearward face of the cavity 263b in the upper face of the driven member 263 is brought up against the rearwardly presented face of the horizontally extending portion 267a of the clutch dog 267. The engaging portion 267c of the clutch dog is then so positioned that its outwardly presented machined surface constitutes a direct continuation of the outer cylindrical surface of the reduced diameter portion 263a of the driven member 263 and of the inner cylindrical surface of the annular driving member 260, as previously described. Therefore, the driving member 260 may continue to rotate without driving the driven member 263, since the driving connection between said members has been rendered ineffective.

It will presently appear that this interruption in the rotation of the driven member 263 effects an interruption in the movement of the opening mechanism 25 at such position that one of the cages 213 of the opening device 26 is permitted to pass through a space between two of the vacuum cups 151 of the opening device, whereby said cage is not supplied with an opened carton blank from the opening device. This effects the desired protective feature which was previously described, for the purpose of preventing a second carton blank from being placed upon one of the blocks 23 from which a blank previously supplied thereto has not been removed.

For the purpose of arresting the movement of the plate 271 to accomplish the result described, a plurality of blocks or stop members 273 are secured to the bottom surface of the plate 271 in predetermined angular relation thereto and in equidistant spacing with respect to each other. The number of blocks 273 that are attached to the plate 271 is equal to the number of vacuum cups 151 on the opening device 25, whereby each of these blocks corresponds to one of the vacuum cups and whereby engagement of certain stopping mechanism about to be described with said block effects an interruption of the movement of the opening mechanism at such position that the carton blank carried by the corresponding vacuum cup 151 is not brought into tangential alignment with the cage 213 of the transfer device 26 which would normally receive said blank.

The arrest in the movement of the plate 271 is adapted to be effected by the engagement of the left-hand extremity of a horizontally extending rod or pin 274, shown in Figs. 17 and 18, with the forward surface of any one of the blocks 273. This pin 274 is mounted for horizontal sliding movement in a direction that is substantially radial with respect to the shaft 105 of the opening mechanism 25, in a lug 275 and a boss portion 276a of a lug 276, both of which lugs depend from the lower surface of a plate or bracket member 277. The pin 274 is biased away from the shaft 105 by a coiled compression spring 278, one extremity of which engages the outer surface of the lug 275 and the other extremity of which engages the inner surface of a collar member 279 that is secured to said pin 274 at an intermediate point thereon.

The pin 274 is adapted to be actuated inwardly; i. e., toward the shaft 105, by a yoke 280, the bifurcated extremities of which are disposed between the outer surface of the collar member 279 and the inner surface of another collar member 281 that is also secured to the pin 274. The yoke 280 is secured to the lower extremity of a vertically extending shaft or pin 282 that is journalled for free rotative movement in the bracket member 277. The shaft 282 extends upwardly through its journal in the bracket member 277 and has secured to its upper extremity a crank arm 283, the outer extremity of which carries a block 284 having a transverse opening therethrough. A rod 285 extends through this opening in the block 284 and is adapted to be adjustably fixed with respect thereto by means of a set-screw 286.

The rod 285 extends from the block 284 to a pivotal connection 287 with the outer extremity of a crank arm 288 that is secured to the lower extremity of a vertically extending shaft or pin 289. The shaft 289 is journalled in the outer extremity of a fixed arm 290 and extends upwardly from the point of its connection with the crank arm 288 through the journal provided by said arm 290. Above the arm 290 a lever arm 291 is fixed to the upper extremity of the shaft 289. The outer extremity of the lever arm 291 carries a finger or contact piece 292 that is disposed adjacent the path of movement of the blocks 23 and at a level corresponding to that of the transverse grooves 236 in the outer faces of said blocks.

When the blocks 23 are normally moved past the outer extremity of the lever arm 291, the contact piece 292 is not engaged thereby because clearance therefor is provided by the grooves 236. The innermost plane of the path of movement of the bottoms of these grooves is indicated by the broken arc 293 in Fig. 18, which, it will be observed, is substantially tangent to the outermost portion of the contact piece 292 to permit the action described. However, when one of the blocks 23 arrives at the position along its path of movement indicated in Fig. 18 and carries an unremoved carton blank 258, the side wall of this blank which covers the groove 236 engages the outer surface of the contact piece 292 and actuates the same toward the central shaft 105 of the opening device 25 in the same manner that the finger 239 of the preferred form of protective mechanism is actuated, as heretofore described with respect to Figs. 15 and 16. This movement of the contact piece 292 effects an arrest in movement of the opening mechanism 25, as will presently appear.

The bracket member 277 is secured at its outer extremity to a vertically extending bar 294, which is suitably supported by the frame 107 of the feeding mechanism. The inner extremity of the bracket member 277 comprises an annular portion 277a surrounding the sleeve 111, which is freely rotatable therewithin. The fixed arm 290 comprises an annular yoke portion 290a that surrounds the annular portion 277a of the bracket member 277 and is securely fixed thereto. In this manner the lever arm 291 carrying the contact piece 292 is firmly supported in such position that it does not interfere with any of the moving parts of the mechanism.

It will be seen on reference to Fig. 17 that the hub portion of the cam 115 is secured to the sleeve 111 immediately above the annular portion 277a of the bracket 277 and the yoke portion 290a of the fixed arm 290, thus preventing vertical displacement of the said bracket and fixed arm, and also of the plate 271 on the sleeve 111.

The lug 276, in the boss portion 276a, on which the rod 274 is slidably supported, also pivotally supports a transverse shaft 295 to which a handle lever 296 is secured. A member 297, comprising lever arms 297a and 297b is also secured to the transverse shaft 295 and is positioned in the same vertical plane as the pin 274. The handle lever 296 is illustrated in its normal position in Figs. 17 and 18, in which position the lever arm 297b engages the boss portion 276a of the lug 276 to limit the movement of the lever handle to the right. The handle is maintained in the position illustrated by the action of gravity, since the center of gravity thereof is to the right of the vertical line through the center of its pivotal support on the shaft 295.

When the lever handle 296 is moved to the left, the lever arm 297a engages the right-hand extremity of the pin 274 and actuates this pin to the left against biasing effect of the compression spring 278. When the pin 274 has been thus actuated, it will be maintained in this position until the handle lever 296 is manually returned to its normal position, since the force of the spring 278 is insufficient to overcome the action of gravity on the handle lever 296 to move this handle lever back past its dead-center position.

The pin 274 will also be actuated inwardly independently of the handle 296 in the event that the contact piece 292 is engaged by an unremoved carton blank 258 on one of the blocks 23. The inward movement of the pin under this condition is accomplished by reason of the fact that such engagement of the contact piece 292 by an unremoved carton blank moves this contact piece toward the central shaft 105 of the opening device 25 and rotates the vertical shaft 289 in a counterclockwise direction as viewed in Fig. 18. The lever arm 288 is thus moved to rotate the vertical shaft 282 in a clockwise direction through the agency of the rod 285 and the lever arm 283. This movement of the shaft 282 causes the yoke member 280 to bear against the outer surface of the collar member 279 carried by the pin 274, and thus to actuate said collar member and pin inwardly.

When the pin 274 is actuated inwardly either by manipulation of the handle lever 296 or by engagement of an unremoved carton blank with the contact piece 292, the inner or left-hand extremity of this pin is positioned in the path of movement of the blocks 273 that are secured to the bottom surface of the rotatable plate 271. As soon as one of these blocks comes into contact with this inwardly projecting extremity of the pin 274, the rotation of the plate 271 is arrested to effect disengagement of the clutch mechanism in the manner heretofore described. Thereupon, the sprocket wheel 27 and the driving member 260 of the clutch mechanism may continue to rotate, but can not transmit this rotation to any of the other parts of the opening device 25 until the pin 274 is retracted by the spring 278 in response to manual return of the handle lever 296 to its normal running position or upon the movement of the unopened carton blank 258 past the contact piece 292.

After the pin 274 is retracted in response to either of these conditions, the spring 268 within the clutch mechanism is again rendered effective to rotate the clutch dog 267 into its engaging position as soon as the next one of the grooves 262 in the inner surface of the driving member 260 comes into alignment with the engaging portion 267c of the clutch dog. Thereupon the driving connection between the driving member 260 and the driven member 263 is re-established to cause the rotation of the sprocket wheel 27 to be transmitted to all of the moving parts of the opening mechanism 25 in the normal manner.

The blocks 273 are so angularly positioned with respect to the plate 271 that the movement of the opening device 25 will be automatically arrested, in response to the engagement of the contact piece 292 by an unremoved carton blank 258, in a predetermined angular position of the vacuum cups 151. This predetermined position is such that the vacuum cup 151 carrying the opened carton blank which would normally be supplied to the block 23 carrying the unremoved blank 258 comes to rest a substantial distance in advance of the position where the said opened carton blank would be received by the corresponding cage 213 of the transfer device 26. This distance is sufficient to permit clearance for the movement of said cage 213 past the parts of the opening device 25 without receiving a carton blank therefrom. Therefore, this cage will not be carrying a blank when it is moved downwardly over the block 23 carrying the said unremoved blank 258. In this manner the desired protective feature is obtained.

As soon as the block 23 carrying the unremoved blank 258 has moved past the contact piece 292, this contact piece and the parts associated therewith are no longer positioned to maintain the pin 274 in the path of movement of the blocks 273, and therefore the clutch mechanism is so released that it will again establish driving connection between the driving and driven parts thereof when the next succeeding groove 262 in the inner surface of the driving member 260 comes into alignment with the engaging portion 267c of the clutch dog 267. Therefore, the movement of the opening device 25 will be resumed in synchronism with that of the transfer device 26 in such manner that the next opened carton blank, which was prevented from being supplied to the block 23 carrying the unremoved blank 258, is received by the next succeeding cage 213 of the transfer device 26 and thereby placed upon the next block 23 following the one carrying the unremoved blank 258.

It will be understood that the handle lever 296 is provided for a purpose similar to that of the handle member 256 heretofore described with respect to the preferred form of protective mechanism, and that said handle lever 296 may be utilized in similar manner to permit the operation of the opening mechanism 25 to be suspended while all of the remaining parts of the apparatus continue in operation for inspection or other purposes.

While only a preferred embodiment of the invention and a single modification of certain details thereof have been shown and described herein, it will be apparent to those skilled in the art that various changes and modifications may be made in the details of construction and arrangement of parts without departing from the spirit and scope of the invention, as set forth in the appended claims.

What is claimed as new and is desired to secure by Letters Patent of the United States is:

1. In combination, a continuously moving carton receiver, reciprocating means for pushing cartons into said receiver, fingers pivoted on the receiver for squaring out the cartons therein, cam-operated means for opening said fingers when the carton is moved into the receiver, and spring-operated means for thereafter closing the fingers on the carton to square the same in the receiver.

2. In a carton feeding machine, a series of movable carton supporting pockets arranged to travel one behind another along a single closed path, and a plurality of carton feeding and opening means each adapted to deliver an open carton into one of said pockets.

3. In a carton feeding machine, a plurality of continuously moving carton supporting pockets arranged to travel one behind another in a single path, and a plurality of carton feeding means each adapted to deliver a carton into one of said pockets.

4. In a carton feeding machine, a knife carrier, and a plurality of knives mounted on said carrier and each movable transversely thereof independently of the other or others.

5. In a carton feeding machine, a knife carrier, a plurality of knives mounted at intervals on said carrier to travel therewith and each move transversely thereof independently of the other or others, and means for moving the knives one after another transversely of the carrier during their travel therewith.

6. In a carton feeding machine, a knife carrier, a plurality of holders fixed at intervals on the carrier, and a corresponding number of knives mounted on the holders to travel therewith and each move transversely of the carrier independently of the other or others.

7. In a carton feeding machine, a knife carrier, a plurality of holders fixed at intervals on the carrier, a corresponding number of knives mounted on the holders to travel therewith and each move independently of the other or others transversely of the path of movement of the carrier, means for moving the carrier and the elements mounted thereon, and means for reciprocating each knife transversely of the path of movement of the carrier independently of the other knife or knives.

8. In a carton feeding machine, an endless carrier, means for driving the same, a plurality of holders fixed at intervals on the carrier, a corresponding number of knives mounted on the holders to travel therewith and reciprocate thereon and means for reciprocating each knife independently of the other or others during their travel with the holders and the carrier.

9. In a carton feeding machine, a movable carrier, a plurality of knives mounted at intervals on said carrier and each movable transversely thereof independently of the other or others, means for moving the carrier and the knives together, and cam means for reciprocating each knife transversely of the carrier independently of the other or others during travel of the knives therewith.

10. In a carton feeding machine, a movable carrier, a plurality of slides mounted at intervals on the carrier to travel therewith and move transversely thereof, a knife and a roller mounted on each slide, and cam means engageable with the rollers to reciprocate the slides and knives transversely of the carrier whereby said knives may each be moved into and out of a carton between the walls thereof.

11. In a carton feeding machine, a continuously driven carrier, a plurality of knives mounted at intervals on the carrier to travel therewith and each move transversely thereof independently of the other or others, and means adapted to reciprocate the knives transversely of the carrier and move each knife into and out of a carton between the walls thereof.

12. In an apparatus of the character described, a carton form or block continuously moving in one plane only, a carton holding receiver having its movement synchronized with said form or block during a portion of their movement, and means for transferring a carton from the receiver onto the continuously moving carton form during the synchronized movement of the receiver and block.

13. In an apparatus of the character described, a carton holder or form continuously moving in one plane only, a carton holding receiver arranged to move into cooperative relation with said form, means for squaring out a carton and, after the same is in squared out condition, placing it in said receiver, and means whereby the carton in the receiver is moved onto the carton form during the synchronized movement of said form and the receiver.

14. In an apparatus of the character described, a carton form or support continuously moving in one plane only, a carton receiver adapted to receive a carton after the latter has been squared out, means for operating said receiver to first receive a squared out carton and afterwards to move in synchronized relation with said continuously moving form, and means whereby the carton in said receiver is transferred onto the continuously moving form.

15. In an apparatus of the character described, means for supporting a stack of collapsed cartons, a continuously moving carton support or form, a carton receiver, means adapted to separate a carton from said stack, means operative after the carton has been fully separated from said stack to open it into squared out position and thereafter place it in said receiver, and means for moving said receiver first into carton receiving position and thereafter in synchronized relation with said form, and means whereby the carton in said receiver is moved onto said form during the continuous movement of the latter.

16. In an apparatus of the character described, a conveyor provided at intervals therealong with carton forms or supports whereby the latter are moved continuously in one plane only, a plurality of carton receivers, means for supporting a stack of cartons, means for separating cartons from said stack, means operative after the full separation of said cartons from said stack to open the same to squared out position, means for feeding said squared out cartons into said receivers, means for moving said receivers successively into synchronized relation with the forms on said conveyor, and means for transferring the cartons from said receivers onto the forms of said conveyor.

17. In an apparatus of the character described, a carton form or block continuously moving in one plane only and adapted to receive a carton enveloping said block in substantially closely fitting relation to permit the rigid holding of said carton during the sealing of the end flaps thereof, a carton receiver, means for squaring out a carton and thereafter placing it in said receiver, and means whereby the carton in said receiver is conveyed from said receiver to said form while said receiver and said form are both moving in synchronized relation.

18. In an apparatus of the character described, a carton form or block continuously moving in one plane only and adapted to receive a carton enveloping said block in substantially closely fitting relation to permit the rigid holding of said carton during the sealing of the end flaps thereof, a carton receiver, means for squaring out a carton and thereafter placing it in said receiver, and means whereby the carton in said receiver is moved into said closely enveloping relation with said form, said means being such that full control is retained over said squared out carton during the entire time that the same is moved from the receiver into tightly enveloping relation with said form.

19. In an apparatus of the character described, a plurality of continuously moving carton receivers and a plurality of means adapted to feed squared out cartons to said receivers, said receivers and said feeding means being adapted to travel in adjacent synchronized relation during the feeding of said squared out cartons into said receivers.

20. In an apparatus of the character described, a plurality of means each adapted to feed squared out cartons, a carton sealing machine, means for carrying cartons from said plurality of feeding means to the carton sealing machine comprising a plurality of movable carton receivers, and means whereby the cartons in said receivers are transferred to said carton sealing machine.

21. In an apparatus of the character described, a plurality of means each adapted to open cartons into squared out position, a carton sealing machine, means for carrying the squared out cartons from the opening means to the carton sealing machines comprising a plurality of continuously moving carton receivers adapted to receive the squared out cartons from said feeding means, and means whereby the cartons in said receivers are transferred to said carton sealing machine.

22. In an apparatus of the character described, a plurality of means each adapted to open cartons to squared out form, a carton conveyor for moving the squared out cartons into sealing position, means for carrying the squared out cartons from the plurality of opening means to the carton conveyor comprising a plurality of carton receivers each adapted to receive a squared out carton from said plurality of opening means, and means whereby the cartons in said receivers are transferred to said conveyor.

23. In an apparatus of the character described, a plurality of means each adapted to open cartons, a carton conveyor comprising a plurality of carton receiving forms, means for carrying the cartons from the opening means to the forms of the conveyor comprising a plurality of receivers to receive the cartons from the opening means, means cooperative with said opening means for recollapsing the cartons and permitting them to assume squared out position prior to reception in said receivers, and means whereby the squared out cartons are transferred under positive continuous control from the receivers to the forms of the carton conveyor.

24. In an apparatus of the character described, a plurality of movable carton receivers adapted to travel continuously one after another along a closed path, and a plurality of carton opening means arranged adjacent the path of travel of the pockets and adapted to deliver cartons into said receivers.

25. In an apparatus of the character described, a series of movable carton receivers arranged to travel one behind another along a single closed path, and a plurality of carton opening means each adapted to deliver an opened carton into one of said receivers.

26. In an apparatus of the character described, a plurality of continuously moving carton receivers arranged to travel one behind another in a single path, and a plurality of carton opening means each adapted to deliver an opened carton into one of said receivers.

27. In an apparatus of the character described, a plurality of carton opening mechanisms, and a plurality of carton receivers, the latter comprising openable and closable walls for receiving squared out cartons with means whereby the pockets may be opened as the receiver moves adjacent to an opening mechanism to receive a squared out carton therefrom.

28. In an apparatus of the character described, a plurality of carton opening mechanisms, a plurality of carton receivers arranged to travel past said opening mechanisms and said receivers adapted to be opened and closed for the reception and retention of squared out cartons, and means for opening and closing said receivers as the latter move adjacent to a carton opening mechanism carrying a squared out carton to be fed to said receiver.

29. In an apparatus of the character described, a plurality of continuously travelling carton receiving pockets adapted to be opened and closed, a plurality of carton opening mechanisms movable to deliver squared out cartons into selected pockets, and means for selectively opening and closing said pockets as the latter receive said squared out cartons.

30. In an apparatus of the character described a plurality of movable carton supporting receiving pockets adapted to travel one after another in a closed path and each adapted to be opened and closed at selected points, a plurality of carton opening mechanisms for squaring out cartons and delivering said squared out cartons into selected pockets, and means for selectively opening and closing said pockets.

31. An apparatus of the character described, including a carton feeding mechanism comprising a series of pockets travelling continuously one after another along a closed path, and a plurality of opening and advancing means for feeding squared out cartons to selected pockets.

32. An automatic feeding device for a packaging machine, comprising a magazine for holding a plurality of carton blanks, an opening device for taking such blanks from the magazine and opening the same, and a transfer device for taking the opened blanks from said opening device and supplying them to the packaging machine.

33. An automatic feeding device for a packaging machine, comprising a magazine for holding a plurality of carton blanks, a rotating assembly for taking such blanks from the magazine and opening the same, and a transfer device for taking the opened blanks from said opening device and supplying them to the packaging machine.

34. An automatic feeding device for a packaging machine, comprising a magazine for holding a plurality of carton blanks, an opening device for taking such blanks from the magazine and opening the same, and a rotating assembly for taking the opened blanks from said opening device and supplying them to the packaging machine.

35. An automatic feeding device for a packaging machine, comprising a magazine for holding a plurality of carton blanks, a rotating assembly for taking such blanks from the magazine and opening the same, and a rotating assembly for taking the opened blanks from said opening device and supplying them to the packaging machine.

36. An automatic feeding device for a packaging machine, comprising a magazine for holding a plurality of carton blanks, a rotating assembly for taking such blanks from the magazine and opening the same, and a transfer device for taking the opened blanks from said opening device and supplying them to the packaging machine, said transfer device comprising a rotating assembly disposed adjacent said first-mentioned rotating assembly.

37. An automatic feeding device for a packaging machine, comprising a magazine for holding a plurality of carton blanks, a rotating assembly for taking such blanks from the magazine and opening the same, and a transfer device for taking the opened blanks from said opening device and supplying them to the packaging machine, said transfer device comprising a rotating assembly disposed adjacent said first-mentioned rotating assembly and oppositely rotating with respect thereto.

38. An automatic feeding device for a packaging machine having a continuously moving endless chain carrying spaced blocks for receiving opened carton blanks, comprising a carton-opening device rotatable by said chain.

39. An automatic feeding device for a packaging machine having a continuously moving endless chain carrying spaced blocks for receiving opened carton blanks, comprising a carton-opening device having a sprocket-wheel engaged by said chain to effect rotation of said opening device.

40. An automatic feeding device for a packaging machine having a continuously moving endless chain carrying spaced blocks for receiving opened carton blanks, comprising a carton-opening device, and a transfer device rotatable by said chain for receiving opened carton blanks from said opening device and placing such blanks on said blocks.

41. An automatic feeding device for a packaging machine having a continuously moving endless chain carrying spaced blocks for receiving opened carton blanks, comprising a carton-opening device rotatable by said chain and a transfer device also rotatable by said chain for receiving opened carton blanks from said opening device and placing such blanks on said blocks.

42. An automatic feeding device for a packaging machine having a continuously moving endless chain carrying spaced blocks for receiving opened carton blanks, comprising a carton-opening device having a sprocket-wheel engaged by said chain to effect rotation of said opening device, and a transfer device rotatable by said chain for receiving opened carton blanks from said opening device and placing such blanks on said blocks.

43. An automatic feeding device for a packaging machine having a continuously moving endless chain carrying spaced blocks for receiving opened carton blanks, comprising a carton-opening device and a transfer device for receiving opened carton blanks from said opening device and placing such blanks on said blocks, said transfer device having a sprocket-wheel engaged by said chain to effect rotation thereof.

44. An automatic feeding device for a packaging machine having a continuously moving endless chain carrying spaced blocks for receiving opened carton blanks, comprising a carton-opening device rotatable by said chain and a transfer device for receiving opened carton blanks from said opening device and placing such blanks on said blocks, said transfer device having a sprocket-wheel engaged by said chain to effect rotation thereof.

45. An automatic feeding device for a packaging machine having a continuously moving endless chain carrying spaced blocks for receiving opened carton blanks, comprising a carton-opening device having a sprocket-wheel engaged by said chain to effect rotation of said opening device, and a transfer device for receiving opened carton blanks from said opening device and placing such blanks on said blocks, said transfer device having a sprocket-wheel engaged by said chain to effect rotation of said transfer device.

46. An automatic feeding device for a packaging machine having a continuously moving endless chain carrying spaced blocks for receiving opened carton blanks, comprising a carton-opening device rotatable by said chain and a transfer device for receiving opened carton blanks from said opening device and placing such blanks on said blocks.

47. An automatic feeding device for a packaging machine having a continuously moving endless chain carrying spaced blocks for receiving opened carton blanks, comprising a carton-opening device having a sprocket-wheel engaged by said chain to effect rotation of said opening device, and a transfer device for receiving opened carton blanks from said opening device and placing such blanks on said blocks.

48. In an automatic feeding device for a packaging machine, a magazine for holding collapsed carton blanks and mechanism for taking such blanks from said magazine and opening them, said mechanism comprising a rotating assembly including a plurality of members for engaging and holding the blanks individually, and individual separating means adapted to be entered between the collapsed walls of the carton blank carried by each of said engaging and holding members.

49. In an automatic feeding device for a packaging machine, a magazine for holding collapsed carton blanks and mechanism for taking such blanks from said magazine and opening them, said mechanism comprising a rotating assembly including a plurality of members for engaging and holding the blanks individually, and an individual vertically slidable separating knife adapted to be entered between the collapsed walls of the carton blank carried by each of said engaging and holding means.

50. A carton-opening device comprising movable means for carrying carton blanks, opening means movable with said carrying means and also movable with respect thereto, means for moving portions of collapsed carton blanks carried by said carrying means to facilitate entry of said opening means between the collapsed walls of said blanks, and means for moving said opening means to cause the same to enter between the collapsed walls of said blanks when such portions thereof are thus moved.

51. A carton-opening device comprising movable means for carrying carton blanks, opening means movable with said carrying means and also movable with respect thereto, means for moving portions of collapsed carton blanks carried by said carrying means to facilitate entry of said opening means between the collapsed walls of said blanks, means for moving said opening means to cause the same to enter between the collapsed walls of said blanks when such portions thereof are thus moved, and means for engaging said blanks to recollapse the same when said opening means have entered between the collapsed walls of said blanks.

52. A carton-opening device comprising movable means for carrying carton blanks, opening means movable with said carrying means and also movable with respect thereto, means for moving portions of collapsed carton blanks carried by said carrying means to facilitate entry of said opening means between the collapsed walls of said blanks, means for moving said opening means to cause the same to enter between the collapsed walls of said blanks when such portions thereof are thus moved, means for engaging said blanks to recollapse the same when said opening means have entered between the collapsed walls of said blanks, and means for removing said opening means from said blanks while the same are being recollapsed.

53. A carton-opening device comprising mechanism rotatable about a vertical axis, a plurality of carton-carrying means carried by said rotatable mechanism, and a plurality of vertically movable carton-opening knives carried by said rotatable mechanism and individually associated with said carton-carrying means.

54. A carton-opening device comprising mechanism rotatable about a vertical axis, a plurality of radially movable carton-carrying means carried by said rotatable mechanism, and a plurality of vertically movable carton-opening knives carried by said rotatable mechanism and individually associated with said carton-carrying means.

55. A carton-opening device comprising mechanism rotatable about a vertical axis, a plurality of carton-carrying means carried by said rotatable mechanism, a plurality of vertically movable carton-opening knives carried by said rotatable mechanism and individually associated with said carton-carrying means, and means for moving said knives vertically to cause the same to enter between the walls of carton blanks carried by said carton-carrying means.

56. A carton-opening device comprising mechanism rotatable about a vertical axis, a plurality of radially movable carton-carrying means carried by said rotatable mechanism, a plurality of vertically movable carton-opening knives carried by said rotatable mechanism and individually associated with said carton-carrying means, and means for effecting cooperative radial movement of said carton-carrying means and vertical movement of said knives to cause the latter to enter between the walls of carton blanks carried by said carton-carrying means.

57. A carton-opening device comprising rotating mechanism, a plurality of carton-carrying means carried by said mechanism, and means for imparting successive radial movements to said carton-carrying means to cause the same to pick up collapsed carton blanks individually and to initiate the opening of said blanks.

58. A carton-opening device comprising rotating mechanism, a plurality of carton-carrying means carried by said mechanism, means for imparting successive radial movements to said carton-carrying means to cause the same to pick up collapsed carton blanks individually and to initiate the opening of said blanks, a plurality of opening means carried by said rotating mechanism in individually associated relation to said carton-carrying means, and means for moving said opening means vertically to cause the same to enter between the walls of the carton blanks carried by said carrying means as the latter are moved radially.

59. A carton-opening device comprising rotating mechanism, a plurality of carton-carrying vacuum cups carried by said mechanism, and means for imparting successive radial movements to said vacuum cups to cause the same to pick up collapsed carton blanks individually and to initiate the opening of said blanks.

60. A carton-opening device comprising rotating mechanism, a plurality of carton-carrying vacuum cups carried by said mechanism, means for imparting successive radial movements to said vacuum cups to cause the same to pick up collapsed carton blanks individually and to initiate the opening of said blanks, a plurality of opening means carried by said rotating mechanism in individually associated relation to said vacuum cups, and means for moving said opening means vertically to cause the same to enter between the walls of the carton blanks carried by said vacuum cups as the latter are moved radially.

61. A carton-opening device comprising rotating mechanism, a plurality of carton-carrying means carried by said mechanism, and means comprising a stationary radial cam for imparting successive radial movements to said carton-carrying means to cause the same to pick up collapsed carton blanks individually and to initiate the opening of said blanks.

62. A carton-opening device comprising rotating mechanism, a plurality of carton-carrying means carried by said mechanism, means comprising a stationary radial cam for imparting successive radial movements to said carton-carrying means to cause the same to pick up collapsed carton blanks individually and to initiate the opening of said blanks, a plurality of opening means carried by said rotating mechanism in individually associated relation to said carton-carrying means, and means for moving said opening means vertically to cause the same to enter between the walls of the carton blanks carried by said carrying means as the latter are moved radially.

63. A carton-opening device comprising rotating mechanism, a plurality of carton-carrying vacuum cups carried by said mechanism, and means comprising a stationary radial cam for imparting successive radial movements to said vacuum cups to cause the same to pick up collapsed carton blanks individually and to initiate the opening of said blanks.

64. A carton-opening device comprising rotating mechanism, a plurality of carton-carrying vacuum cups carried by said mechanism, means comprising a stationary radial cam for imparting successive radial movements to said vacuum cups to cause the same to pick up collapsed carton blanks individually and to initiate the opening of said blanks, a plurality of opening means carried by said rotating mechanism in individually associated relation to said vacuum cups, and means for moving said opening means vertically to cause the same to enter between the walls of the carton blanks carried by said vacuum cups as the latter are moved radially.

65. A carton-opening device comprising rotating mechanism, a plurality of carton-carrying means carried by said mechanism, means for imparting successive radial movements to said carton-carrying means to cause the same to pick up collapsed carton blanks individually and to initiate the opening of said blanks, a plurality of opening means carried by said rotating mechanism in individually associated relation to said carton-carrying means, and means comprising a stationary cylindrical cam for moving said opening means vertically to cause the same to enter between the walls of the carton blanks carried by said carrying means as the latter are moved radially.

66. A carton-opening device comprising rotating mechanism, a plurality of carton-carrying vacuum cups carried by said mechanism, means for imparting successive radial movements to said vacuum cups to cause the same to pick up collapsed carton blanks individually and to initiate the opening of said blanks, a plurality of opening means carried by said rotating mechanism in individually associated relation to said vacuum cups, and means comprising a stationary cylindrical cam for moving said opening means vertically to cause the same to enter between the walls of the carton blanks carried by said vacuum cups as the latter are moved radially.

67. A carton-opening device comprising rotating mechanism, a plurality of carton-carrying means carried by said mechanism, means comprising a stationary radial cam for imparting successive radial movements to said carton-carrying means to cause the same to pick up collapsed carton blanks individually and to initiate the opening of said blanks, a plurality of opening means carried by said rotating mechanism in individually associated relation to said carton-carrying means, and means comprising a stationary cylindrical cam for moving said opening means vertically to cause the same to enter between the walls of the carton blanks carried by said carrying means as the latter are moved radially.

68. A carton-opening device comprising rotating mechanism, a plurality of carton-carrying vacuum cups carried by said mechanism, means comprising a stationary radial cam for imparting successive radial movements to said vacuum cups to cause the same to pick up collapsed carton blanks individually and to initiate the opening of said blanks, a plurality of opening means carried by said rotating mechanism in individually associated relation to said vacuum cups, and means comprising a stationary cylindrical cam for moving said opening means vertically to cause the same to enter between the walls of the carton blanks carried by said vacuum cups as the latter are moved radially.

69. In an automatic feeding device for a packaging machine, in combination, a magazine for holding a plurality of collapsed carton blanks, an opening device, and a transfer device, said opening device comprising rotating mechanism, a plurality of carton-carrying means carried by said mechanism, and means for imparting successive radial movements to said carton-carrying means to cause the same to take collapsed carton blanks individually from said magazine, to initiate the opening of said blanks, and to deliver said blanks to said transfer device.

70. In an automatic feeding device for a packaging machine, in combination, a magazine for holding a plurality of collapsed carton blanks, an opening device, and a transfer device, said opening device comprising rotating mechanism, a plurality of carton-carrying vacuum cups carried by said mechanism, and means for imparting successive radial movements to said vacuum cups to cause the same to take collapsed carton blanks individually from said magazine, to initiate the opening of said blanks, and to deliver said blanks to said transfer device.

71. In an automatic feeding device for a packaging machine, in combination, a magazine for holding a plurality of collapsed carton blanks, an opening device, and a transfer device, said opening device comprising rotating mechanism, a plurality of carton-carrying means carried by said mechanism, and means comprising a stationary radial cam for imparting successive radial movements to said carton-carrying means to cause the same to take collapsed carton blanks individually from said magazine, to initiate the opening of said blanks, and to deliver said blanks to said transfer device.

72. In an automatic feeding device for a packaging machine, in combination, a magazine for holding a plurality of collapsed carton blanks, an opening device, and a transfer device, said opening device comprising rotating mechanism, a plurality of carton-carrying vacuum cups carried by said mechanism, and means comprising a stationary radial cam for imparting successive radial movements to said vacuum cups to cause the same to take collapsed carton blanks individually from said magazine, to initiate the opening of said blanks, and to deliver said blanks to said transfer device.

73. In an automatic feeding device for a packaging machine, in combination, a magazine for holding a plurality of collapsed carton blanks, an opening device, and a transfer device, said opening device comprising rotating mechanism, a plurality of carton-carrying vacuum cups carried by said mechanism, means for imparting successive radial movements to said vacuum cups to cause the same to take collapsed carton blanks individually from said magazine, to initiate the opening of said blanks, and to deliver said blanks to said transfer device, evacuating means, means for connecting said vacuum cups to said evacuating means, and means for disconnecting said vacuum cups from said evacuating means as the carton blanks carried thereby are delivered to said transfer device.

74. In an automatic feeding device for a packaging machine, in combination, a magazine for holding a plurality of collapsed carton blanks, an opening device, and a transfer device, said opening device comprising rotating mechanism, a plurality of carton-carrying vacuum cups carried by said mechanism, means comprising a stationary radial cam for imparting successive radial movements to said vacuum cups to cause the same to take collapsed carton blanks individually from said magazine, to initiate the opening of said blanks; and to deliver said blanks to said transfer device, evacuating means, means for connecting said vacuum cups to said evacuating means, and means for disconnecting said vacuum cups from said evacuating means as the carton blanks carried thereby are delivered to said transfer device.

75. In an automatic feeding device for a packaging machine, in combination, a magazine for holding a plurality of collapsed carton blanks, an opening device, and a transfer device, said opening device comprising rotating mechanism, a plurality of carton-carrying vacuum cups carried by said mechanism, means for imparting successive radial movements to said vacuum cups to cause the same to take collapsed carton blanks individually from said magazine, to initiate the opening of said blanks, and to deliver said blanks to said transfer device, evacuating means, means for connecting said vacuum cups to said evacuating means, and means comprising a rotary valve disposed in said connecting means and actuated by said rotating mechanism for disconnecting said vacuum cups from said evacuating means as the carton blanks carried by said vacuum cups are delivered to said transfer device.

76. In an automatic feeding device for a packaging machine, in combination, a magazine for holding a plurality of collapsed carton blanks, an opening device, and a transfer device, said opening device comprising rotating mechanism, a plurality of carton-carrying vacuum cups carried by said mechanism, means comprising a stationary radial cam for imparting successive radial movements to said vacuum cups to cause the same to take collapsed carton blanks individually from said magazine, to initiate the opening of said blanks, and to deliver said blanks to said transfer device, evacuating means, means for connecting said vacuum cups to said evacuating means, and means comprising a rotary valve disposed in said connecting means and actuated by said rotating mechanism for disconnecting said vacuum cups from said evacuating means as the carton blanks carried by said vacuum cup are delivered to said transfer device.

77. In an automatic feeding device for a packaging machine, a magazine for holding a plurality of carton blanks, a plurality of vacuum cups for taking such blanks individually from said magazine, evacuating means, means for connecting each of said vacuum cups to said evacuating means, a valve biased to closed position in each of said connecting means, a stem connected to each of said valves and projecting outwardly through the corresponding vacuum cup to be engaged by the carton blanks taken by said cup for opening said valve, auxiliary carton-blank-supporting means associated with said magazine, means for individually positioning carton blanks from said magazine between said vacuum cups and said auxiliary supporting means, and means for effecting relative movement of said vacuum cups and said auxiliary supporting means toward each other to effect firm engagement between said vacuum cups and the thus interposed carton blanks and to cause the corresponding said valves to be opened by engagement between said projecting stems and the carton blanks.

78. In an automatic feeding device for a packaging machine, a magazine for holding a plurality of carton blanks, a plurality of vacuum cups for taking such blanks individually from said magazine, evacuating means, means for connecting each of said vacuum cups to said evacuating means, a valve biased to closed position in each of said connecting means, a stem connected to each of said valves and projecting outwardly through the corresponding vacuum cup to be engaged by the carton blanks taken by said cup for opening said valve, auxiliary carton-blank-supporting means associated with said magazine, means for individually positioning carton blanks from said magazine between said vacuum cups and said auxiliary supporting means, and means for moving said vacuum cups toward said auxiliary supporting means to force the former against the thus interposed carton blanks and to cause the corresponding said valves to be opened by engagement between said projecting stems and the carton blanks.

79. In an automatic feeding device for a packaging machine, a magazine for holding a plurality of carton blanks, a plurality of vacuum cups for taking such blanks individually from said magazine, evacuating means, means for connecting each of said vacuum cups to said evacuating means, a valve biased to closed position in each of said connecting means, a stem connected to each of said valves and projecting outwardly through the corresponding vacuum cup to be engaged by the carton blanks taken by said cup for opening said valve, auxiliary carton-blank-supporting means associated with said magazine, means for individually positioning carton blanks from said magazine between said vacuum cups and said auxiliary supporting means, means for effecting relative movement of said vacuum cups and said auxiliary supporting means toward each other to effect firm engagement between said vacuum cups and the thus interposed carton blanks and to cause the corresponding said valves to be opened by enegagement between said projecting stems and the carton blanks, said auxiliary supporting means being recessed to accommodate said stems without opening said valves when no carton blank is positioned between the corresponding vacuum cups and said auxiliary supporting means.

80. In an automatic feeding device for a packaging machine, a magazine for holding a plurality of carton blanks, a plurality of vacuum cups for taking such blanks individually from said magazine, evacuating means, means for connecting each of said vacuum cups to said evacuating means, a valve biased to closed position in each of said connecting means, a stem connected to each of said valves and projecting outwardly through the corresponding vacuum cup to be engaged by the carton blanks taken by said cup for opening said valve, auxiliary carton-blank-supporting means associated with said magazine, means for individually positioning carton blanks from said magazine between said vacuum cups and said auxiliary supporting means, means for moving said vacuum cups toward said auxiliary supporting means to force the former against the thus interposed carton blanks and to cause the corresponding said valves to be opened by engagement between said projecting stems and the carton blanks, said auxiliary supporting means being recessed to accommodate said stems without opening said valves when no carton blank is positioned between the corresponding vacuum cups and said auxiliary supporting means.

81. In an automatic feeding device for a packaging machine, a magazine for holding a plurality of carton blanks, a plurality of vacuum cups for taking such blanks individually from said magazine, evacuating means, means for connecting each of said vacuum cups to said evacuating means, a valve biased to closed position in each of said connecting means, a stem connected to each of said valves and projecting outwardly through the corresponding vacuum cup to be engaged by the carton blanks taken by said cup for opening said valve, a carton-blank-supporting roller associated with said magazine, means for individually positioning carton blanks from said magazine between said vacuum cups and said roller, and means for effecting relative movement of said vacuum cups and said roller toward each other to effect firm engagement between said vacuum cups and the thus interposed carton blanks and to cause the corresponding said valves to be opened by engagement between said projecting stems and the carton blanks.

82. In an automatic feeding device for a packaging machine, a magazine for holding a plurality of carton blanks, a plurality of vacuum cups for taking such blanks individually from said magazine, evacuating means, means for connecting each of said vacuum cups to said evacuating means, a valve biased to closed position in each of said connecting means, a stem connected to each of said valves and projecting outwardly through the corresponding vacuum cup to be engaged by the carton blanks taken by said cup for opening said valve, a carton-blank-supporting roller associated with said magazine, means for individually positioning carton blanks from said magazine between said vacuum cups and said roller, and means for moving said vacuum cups toward said roller to force the former against the thus interposed carton blanks and to cause the corresponding said valves to be opened by engagement between said projecting stems and the carton blanks.

83. In an automatic feeding device for a packaging machine, a magazine for holding a plurality of carton blanks, a plurality of vacuum cups for taking such blanks individually from said magazine, evacuating means, means for connecting each of said vacuum cups to said evacuating means, a valve biased to closed position in each of said connecting means, a stem connected to each of said valves and projecting outwardly through the corresponding vacuum cup to be engaged by the carton blanks taken by said cup for opening said valve, a carton-blank-supporting roller associated with said magazine, means for individually positioning carton blanks from said magazine between said vacuum cups and said roller, means for effecting relative movement of said vacuum cups and said roller toward each other to effect firm engagement between said vacuum cups and the thus interposed carton blanks and to cause the corresponding said valves to be opened by engagement between said projecting stems and the carton blanks, said roller being circumferentially recessed to accommodate said stems without opening said valves when no carton blank is positioned between the corresponding vacuum cups and said roller.

84. In an automatic feeding device for a packaging machine, a magazine for holding a plurality of carton blanks, a plurality of vacuum cups for taking such blanks individually from said magazine evacuating means, means for connecting each of said vacuum cups to said evacuating means, a valve biased to closed position in each of said connecting means, a stem connected to each of said valves and projecting outwardly through the corresponding vacuum cup to be engaged by the carton blanks taken by said cup for opening said valve, a carton-blank-supporting roller associated with said magazine, means for individually positioning carton blanks from said magazine between said vacuum cups and said roller, means for moving said vacuum cups toward said roller to force the former against the thus interposed carton blanks and to cause the corresponding said valves to be opened by engagement between said projecting stems and the carton blanks, said roller being circumferentially recessed to accommodate said stems without opening said valves when no carton blank is positioned between the corresponding vacuum cups and said roller.

85. A carton-transferring device comprising rotating mechanism, a plurality of cages carried by said mechanism and adapted to hold opened carton blanks individually, and means for reciprocating said cages in a direction parallel to the axis of rotation of said rotating mechanism.

86. A carton-transferring device comprising mechanism rotating about a vertical axis, a plurality of cages carried by said mechanism and adapted to hold opened carton blanks individually, and means for vertically reciprocating said cages.

87. A carton-transferring device comprising a fixed vertical shaft, mechanism journaled for rotation about said shaft, a plurality of cakes carried by said mechanism and adapted to hold opened carton blanks individually, and a cylindrical cam secured to said fixed vertical shaft and cooperating with said cages to effect vertical reciprocation of the latter.

88. A carton-transferring device comprising rotating mechanism, a plurality of cages carried by said mechanism and adapted to hold opened carton blanks individually, means for reciprocating said cages in a direction parallel to the axis of rotation of said rotating mechanism, and means for closing and opening said cages to cause them to grasp and release opened carton blanks.

89. A carton-transferring device comprising mechanism rotating about a vertical axis, a plurality of cakes carried by said mechanism and adapted to hold opened carton blanks individually, means for vertically reciprocating said cages, and means for closing and opening said cages to cause them to grasp and release opened carton blanks.

90. A carton-transferring device comprising a fixed vertical shaft, mechanism journaled for rotation about said shaft, a plurality of cages carried by said mechanism and adapted to hold opened carton blanks individually, a cylindrical cam secured to said fixed vertical shaft and cooperating with said cages to effect vertical reciprocation of the latter, and means for closing and opening said cages to cause them to grasp and release opened carton blanks.

91. A carton-transferring device comprising a fixed vertical shaft, mechanism journaled for rotation about said shaft, a plurality of cages carried by said mechanism and adapted to hold opened carton blanks individually, a cylindrical cam secured to said fixed vertical shaft and cooperating with said cages to effect vertical reciprocation of the latter, and means comprising another cylindrical cam secured to said fixed vertical shaft for closing and opening said cages to cause them to grasp and release opened carton blanks.

92. A carton-transferring device comprising a fixed vertical shaft, mechanism journaled for rotation about said shaft, a plurality of cages carried by said mechanism and adapted to hold opened carton blanks individually, a cylindrical cam secured to said fixed vertical shaft and cooperating with said cages to effect vertical reciprocation of the latter, resilient means tending to close said cages to cause the same to grasp opened carton blanks, another cylindrical cam secured to said fixed vertical shaft, and means associated with said cages and cooperating with said last-mentioned cam as said cages are rotated to open the latter for releasing the opened carton blanks.

93. A carton-transferring device comprising a fixed vertical shaft, mechanism journaled for rotation about said shaft, a plurality of cages carried by said mechanism and adapted to hold opened carton blanks individually, a cylindrical cam secured to said fixed vertical shaft, and cooperating with said cages to effect vertical reciprocation of the latter, resilient means tending to close said cages to cause the same to grasp opened carton blanks, another cylindrical cam secured to said fixed vertical shaft, and means associated with said cages and cooperating with said last-mentioned cam as said cages are rotated to open the latter for releasing the opened carton blanks and to maintain said cages in open position until opened carton blanks may be delivered thereto.

94. In an automatic feeding device for a packaging machine, in combination, a carton-opening device and a carton-transferring device, said opening device comprising moving mechanism including means for holding and carrying individual carton blanks and means for releasing said holding means, said transferring device comprising mechanism moving in juxtaposition to said opening device and including means for grasping opened carton blanks carried by said opening device, and said mechanisms being so synchronized in movement that the blanks are released by the holding means of the opening device as soon as they are grasped by the said means included in said moving mechanism of the transferring device.

95. In an automatic feeding device for a packaging machine, in combination, a carton-opening device and a carton-transferring device, said opening device comprising moving mechanism including a plurality of vacuum cups for holding and carrying individual carton blanks, evacuating means, connections between said vacuum cups and said evacuating means, and means for interrupting said connections, said transferring device comprising mechanism moving in juxtaposition to said opening device and including means for grasping opened carton blanks carried by said opening device, said mechanisms being so synchronized in movement that the connections between said vacuum cups and said evacuating means are interrupted as soon as the carton blanks carried by said vacuum cups are grasped by the said means included in said moving mechanism of the transferring device.

96. In an automatic feeding device for a packaging machine, in combination, a carton-opening device and a carton-transferring device, said opening device comprising moving mechanism including means for holding and carrying individual carton blanks and means for releasing said holding means, said transferring device comprising mechanism moving in juxtaposition to said opening device and including opening and closing cages for grasping opened carton blanks carried by said opening device, said mechanisms being so synchronized in movement that the blanks are released by the holding means of the opening device as soon as they are grasped by said cages as the latter close.

97. In an automatic feeding device for a packaging machine, in combination, a carton-opening device and a carton-transferring device, said opening device comprising moving mechanism including a plurality of vacuum cups for holding and carrying individual carton blanks, evacuating means, connections between said vacuum cups and said evacuating means, and means for interrupting said connections, said transferring device comprising mechanism moving in juxtaposition to said opening device and including opening and closing cages for grasping opened carton blanks carried by said opening device, said mechanisms being so synchronized in movement that the connections between said vacuum cups and said evacuating means are interrupted as soon as the carton blanks carried by said vacuum cups are grasped by said cages as the latter close.

98. The combination with a packaging machine comprising a series of moving blocks adapted to have opened carton blanks placed thereon, of a carton-opening device and a carton-transferring device, said transferring device comprising means for carrying opened carton blanks, means for causing said carrying means to take opened carton blanks individually from said opening device, means for moving said carrying means in synchronism and alignment with said blocks, and means for moving said carrying means over said blocks during such synchronized movement to cause the opened carton blanks carried by said carrying means to be placed upon said blocks.

99. The combination with a packaging machine comprising a series of moving blocks adapted to have opened carton blanks placed thereon, of a carton-opening device and a carton-transferring device, said transferring device comprising means for carrying opened carton blanks, means for causing said carrying means to take opened carton blanks individually from said opening device, means for moving said carrying means in synchronism and alignment with said blocks, means for moving said carrying means over said blocks during such synchronized movement to cause the opened carton blanks carried by said carrying means to be placed upon said blocks, and means for causing said carrying means to release the carton blanks when they have been thus placed upon said blocks.

100. The combination with a packaging machine comprising a series of blocks adapted to have opened carton blanks placed thereon, and a continuously moving chain carrying said blocks, of a carton-opening device and a carton-transferring device, said transferring device comprising means for carrying opened carton blanks, means for causing said carrying means to take opened carton blanks individually from said opening device, means actuated by said chain for moving said carrying means in synchronism and alignment with said blocks, and means for moving said carrying means over said blocks during such synchronized movement to cause the opened carton blanks carried by said carrying means to be placed upon said blocks.

101. The combination with a packaging machine comprising a series of blocks adapted to have opened carton blanks placed thereon, and a continuously moving chain carrying said blocks, of a carton-opening device and a carton-transferring device, said opening device comprising means for carrying and opening carton blanks individually, and means actuated by said chain for moving said carrying means, said transferring device comprising means for carrying opened carton blanks, means actuated by said chain for moving said latter carrying means through a path adjoining the path of movement of the carrying means of the opening device and in synchronism therewith, means for causing the carrying means of the transferring device to take opened carton blanks individually from the carrying means of the opening device during the adjacent synchronous movement of said two carrying means, said last-mentioned chain-actuated means also effecting movement of said carrying means of the transferring device in synchronism and alignment with said blocks, and means for moving said last-mentioned carrying means over said blocks during such synchronized and aligned movement to cause the opened carton blanks carried by said last-mentioned carrying means to be placed upon said blocks.

102. The combination with a packaging machine comprising a series of blocks adapted to have opened carton blanks placed thereon, and a continuously moving chain carrying said blocks, of a carton-opening device and a carton-transferring device, said opening device comprising means for carrying and opening carton blanks individually, and means actuated by said chain for moving said carrying means, said transferring device comprising means for carrying opened carton blanks, means actuated by said chain for moving said latter carrying means through a path adjoining the path of movement of the carrying means of the opening device and in synchronism therewith, means for causing the carrying means of the transferring device to take opened carton blanks individually from the carrying means of the opening device during the adjacent synchronous movement of said two carrying means, said last-mentioned chain-actuated means also effecting movement of said carrying means of the transferring device in synchronism and alignment with said blocks, means for moving said last-mentioned carrying means over said blocks during said synchronized and aligned movement to cause the opened carton blanks carried by said last-mentioned carrying means to be placed upon said blocks, and means for causing said last-mentioned carrying means to release the carton blanks when they have been thus placed upon said blocks.

103. A carton-transferring device comprising a fixed vertical shaft, a rotating supporting member journaled on said shaft, a plurality of vertical guiding members carried by said supporting member, a sleeve slidable on each of said guiding members, a cam roller pivotally mounted on each of said sleeves, a pair of spaced stationary cylindrical cams secured to said fixed shaft, between which cams said rollers are operatively disposed to effect vertical reciprocation of said sleeves on said guiding members as said supporting member and the mechanism carried thereby are rotated, a cage carried by each of said sleeves and having a back portion rigid with the sleeve, a pair of vertical shafts journaled at opposite sides of said back portion and respectively having movable side portions of the cage secured thereto, a beveled pinion secured to each of said vertical shafts, a beveled gear-wheel meshing with each of said pinions, a transverse shaft journaled in said back portion of the cage and having said gear-wheels secured thereto, an arm also secured to said transverse shaft, and a cam roller pivotally carried by said arm, and another stationary cylindrical cam secured to said fixed vertical shaft and cooperating with said last-mentioned cam rollers to effect opening and closing of said cages.

104. The combination with a packaging machine comprising a plurality of continuously moving blocks adapted to have opened carton blanks placed thereon, of carton feeding mechanism for automatically placing opened carton blanks individually on said blocks, and means responsive to the presence of a blank on any of said blocks for preventing said feeding mechanism from attempting to place another blank on said block.

105. The combination with a packaging machine comprising a series of continuously moving blocks adapted to have opened carton blanks placed thereon, of carton feeding mechanism for automatically placing opened carton blanks individually on said blocks, and means responsive to the presence of a blank on any of said blocks as such block passes a predetermined point in its path of travel for preventing said feeding mechanism from attempting to place another blank on said block.

106. The combination with a packaging machine comprising a plurality of continuously moving blocks adapted to have opened carton blanks placed thereon, and each having a groove extending in the direction of travel of said blocks in a surface covered by a carton blank when one of the latter is in place on the block, of carton-feeding mechanism for automatically placing opened carton blanks individually on said blocks, and means responsive to the presence of a blank on any of said blocks for preventing said feeding mechanism from attempting to place another blank on said block, said means comprising a member projecting into the space included within said grooves as said blocks move through their path of travel, whereby said member will be freely cleared by blocks having no blanks thereon, but will be engaged by a blank which remains in place on any of said blocks as the latter passes said member.

107. The combination with a packaging machine comprising a plurality of continuously moving blocks adapted to have opened carton blanks placed thereon, of carton-feeding mechanism for automatically placing opened carton blanks individually on said blocks, said mechanism comprising a magazine for holding a plurality of collapsed carton blanks and an opening device adapted to take such blanks from said magazine individually preparatory to supplying the same to said blocks, and means responsive to the presence of a blank on any of said blocks for preventing the supplying of a blank from said magazine to said opening device at such a time that an attempt would be made to place said blank upon said block.

108. The combination with a packaging machine comprising a plurality of continuously moving blocks adapted to have opened carton blanks placed thereon, of carton-feeding mechanism for automatically placing opened carton blanks individually on said blocks, said mechanism comprising a magazine for holding a plurality of collapsed carton blanks and an opening device adapted to take such blanks from said magazine individually preparatory to supplying the same to said blocks, and means responsive to the presence of a blank on any of said blocks for delaying the supplying from said magazine to said opening device of the blank which would normally be placed upon said block so that no attempt will be made to place a blank upon said block and so that said blank will be placed upon the next succeeding block which does not have a blank thereon.

109. The combination with a packaging machine comprising a plurality of blocks adapted to have opened carton blanks placed thereon, of carton-feeding mechanism for automatically placing opened carton blanks individually on said blocks, said mechanism comprising a magazine for holding a plurality of collapsed carton blanks and an opening device adapted to take such blanks from said magazine individually preparatory to supplying the same to said blocks, means associated with said magazine for individually feeding out collapsed carton blanks therefrom to be taken by said opening device, and means responsive to the presence of a carton blank on any of said blocks for preventing said last-mentioned means from feeding a collapsed carton blank to said opening device at such time that said blank would normally be supplied to said block.

110. The combination with a packaging machine comprising a plurality of blocks adapted to have opened carton blanks placed thereon, of carton-feeding mechanism for automatically placing opened carton blanks individually on said blocks, said mechanism comprising a magazine for holding a plurality of collapsed carton blanks and an opening device adapted to take such blanks from said magazine individually preparatory to supplying the same to said blocks, spring-actuated and cam-retrieved means associated with said magazine for individually feeding out collapsed carton blanks therefrom to be taken by said opening device, and latching means responsive to the presence of a carton blank on any of said blocks for preventing said last-mentioned means from feeding a collapsed carton blank to said opening device at such time that said blank would normally be supplied to said block.

111. The combination with a packaging machine comprising a plurality of blocks adapted to have opened carton blanks placed thereon, of carton-feeding mechanism for automatically placing opened carton blanks individually on said blocks, said mechanism comprising a magazine for holding a plurality of collapsed carton blanks and an opening device adapted to take such blanks from said magazine individually preparatory to supplying the same to said blocks, means associated with said magazine for individually feeding out collapsed carton blanks therefrom to be taken by said opening device, means responsive to the presence of a carton blank on any of said blocks for preventing said last-mentioned means from feeding a collapsed carton blank to said opening device at such time that said blank would normally be supplied to said block, and manually operable means for also rendering said preventing means effective, whereby the operation of said feeding-out means may be suspended subject to the will of an operator, independently of the operation of said opening device.

112. The combination with a packaging machine comprising a plurality of blocks adapted to have opened carton blanks placed thereon, of carton-feeding mechanism for automatically placing opened carton blanks individually on said blocks, said mechanism comprising a magazine for holding a plurality of collapsed carton blanks and an opening device adapted to take such blanks from said magazine individually preparatory to supplying the same to said blocks, spring-actuated and cam-retrieved means associated with said magazine for individually feeding out collapsed carton blanks therefrom to be taken by said opening device, latching means responsive to the presence of a carton blank on any of said blocks for preventing said last-mentioned means from feeding a collapsed carton blank to said opening device at such time that said blank would normally be supplied to said block, and manually operable means for also rendering said latching means effective, whereby the operation of said feeding-out means may be suspended subject to the will of an operator, independently of the operation of said opening device.

113. The combination with a packaging machine comprising a plurality of blocks adapted to have opened carton blanks placed thereon, of carton-feeding mechanism for automatically placing opened carton blanks individually on said blocks, said mechanism comprising a magazine for holding a plurality of collapsed carton blanks, an opening device adapted to take such blanks from said magazine individually, and a transferring device for taking opened carton blanks from said opening device and placing the same upon said blocks, and means responsive to the presence of a blank on any of said blocks for interrupting the operation of said opening device to prevent the transferring device from taking a blank therefrom at such a time that said blank would normally be supplied to said block.

114. The combination with a packaging machine comprising a plurality of blocks adapted to have opened carton blanks placed thereon, of carton-feeding mechanism for automatically placing opened carton blanks individually on said blocks, said mechanism comprising a magazine for holding a plurality of collapsed carton blanks, an opening device adapted to take such blanks from said magazine individually, and a transferring device for taking opened carton blanks from said opening device and placing the same upon said blocks, a clutch embodied in said opening device for controlling the operation thereof, and means responsive to the presence of a blank on any of said blocks for releasing said clutch to interrupt the operation of said opening device whereby no blank is supplied to the transferring device at such time as to be supplied to said block.

115. The combination with a packaging machine comprising a plurality of blocks adapted to have opened carton blanks placed thereon, of carton-feeding mechanism for automatically placing opened carton blanks individually on said blocks, said mechanism comprising a magazine for holding a plurality of collapsed carton blanks, an opening device adapted to take such blanks from said magazine individually, and a transferring device for taking opened carton blanks from said opening device and placing the same upon said blocks, a clutch embodied in said opening device for controlling the operation thereof, means responsive to the presence of a blank on any of said blocks for releasing said clutch to interrupt the operation of said opening device whereby no blank is supplied to the transferring device at such time as to be supplied to said block, and manually operable means for releasing said clutch whereby the operation of said opening device may be suspended subject to the will of an operator, independently of the operation of said transferring device.

JOHN L. FERGUSON.